US010200509B1

(12) United States Patent
Maharia et al.

(10) Patent No.: US 10,200,509 B1
(45) Date of Patent: Feb. 5, 2019

(54) RELATIVE AIRTIME FAIRNESS IN A WIRELESS NETWORK

(71) Applicant: Juniper Networks, Inc., Sunnyvale, CA (US)

(72) Inventors: Rashmi Maharia, Sikar (IN); Rajeev K. Koripalli, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 768 days.

(21) Appl. No.: 14/487,408

(22) Filed: Sep. 16, 2014

(51) Int. Cl.
| | |
|---|---|
| *H04Q 7/20* | (2006.01) |
| *H04W 72/08* | (2009.01) |
| *H04W 48/20* | (2009.01) |
| *H04W 72/04* | (2009.01) |
| *H04W 28/18* | (2009.01) |
| *H04L 29/06* | (2006.01) |

(52) U.S. Cl.
CPC .................................. *H04L 69/10* (2013.01)

(58) Field of Classification Search
CPC ............................. H04B 7/212; H04W 84/047
See application file for complete search history.

(56) References Cited

U.S. PATENT DOCUMENTS

| 8,483,194 | B1 | 7/2013 | Wu et al. | |
|---|---|---|---|---|
| 2005/0068922 | A1* | 3/2005 | Jalali ................... | H04J 13/0048 370/335 |
| 2005/0099979 | A1* | 5/2005 | Chandra ............. | H04L 12/5693 370/338 |
| 2005/0180444 | A1* | 8/2005 | Gu ........................ | H04L 47/10 370/412 |
| 2006/0203778 | A1* | 9/2006 | Han ................... | H04W 72/1257 370/335 |
| 2007/0195787 | A1* | 8/2007 | Alnuweiri ............... | H04L 47/10 370/395.4 |

(Continued)

FOREIGN PATENT DOCUMENTS

KR         20150049232 A   * 10/2013

OTHER PUBLICATIONS

C.Annadurai; Review of Packet Scheduling Algorithms in Mobile Ad Hoc Networks; vol. 15—No. 1, Feb. 2011; International Journal of Computer Applications.*

(Continued)

*Primary Examiner* — Kevin T Bates
*Assistant Examiner* — Mark A Scott
(74) *Attorney, Agent, or Firm* — Harrity & Harrity, LLP

(57) ABSTRACT

A device may generate a frame including data to be provided to a client device. The data may be associated with a rate corresponding to the client device. The device may determine rate information, associated with a set of client devices, that identifies the rate and one or more other rates. The device may determine a relative frame transmission time (RFTT) associated with the frame. The device may determine a frame scheduling number (FSN), associated with the frame, based on the RFTT. The device may schedule the frame for provision to the client device based on the FSN. The device may provide the frame to the client device based on scheduling the FSN. The frame may be provided to cause relative airtime fairness between a first group of frames, corresponding to the rate, and a second group of frames, corresponding to the one or more other rates, to be achieved.

20 Claims, 16 Drawing Sheets

(56) References Cited

U.S. PATENT DOCUMENTS

| | | | |
|---|---|---|---|
| 2008/0025286 A1* | 1/2008 | Li | H04L 47/14 370/347 |
| 2008/0137537 A1* | 6/2008 | Al-Manthari | H04W 72/1257 370/238 |
| 2010/0062782 A1* | 3/2010 | Higuchi | H04L 1/0007 455/450 |
| 2010/0124205 A1* | 5/2010 | Ghanadan | H04W 72/1278 370/336 |
| 2010/0189060 A1* | 7/2010 | Wang | H04L 47/522 370/329 |
| 2010/0290352 A1* | 11/2010 | Oyman | H04W 72/085 370/252 |
| 2011/0039554 A1* | 2/2011 | Bims | H04L 1/0033 455/434 |
| 2011/0116460 A1* | 5/2011 | Kovvali | H04L 47/621 370/329 |
| 2011/0249557 A1* | 10/2011 | Malati | H04W 28/10 370/235 |
| 2012/0128007 A1* | 5/2012 | Panwar | H04L 49/101 370/412 |
| 2012/0140699 A1* | 6/2012 | Seo | H04W 72/1252 370/315 |
| 2012/0147822 A1* | 6/2012 | Deb | H04W 74/085 370/329 |
| 2012/0294161 A1* | 11/2012 | Sunay | H04W 72/1236 370/252 |
| 2013/0225220 A1* | 8/2013 | Dotzler | H04W 72/1226 455/509 |
| 2013/0231149 A1 | 9/2013 | Zhou | |
| 2013/0336319 A1* | 12/2013 | Liu | H04L 47/621 370/390 |
| 2014/0269635 A1* | 9/2014 | Shapira | H04W 72/04 370/336 |
| 2014/0293970 A1* | 10/2014 | Damnjanovic | H04L 5/0078 370/336 |
| 2014/0321376 A1* | 10/2014 | Damnjanovic | H04W 72/1215 370/329 |
| 2014/0366069 A1* | 12/2014 | Ramamurthi | H04W 36/22 725/62 |
| 2016/0000900 A1* | 1/2016 | Zhou | A61K 39/12 424/186.1 |
| 2016/0242077 A1* | 8/2016 | Horneman | H04W 36/0016 |

OTHER PUBLICATIONS

Nararat Ruangchaijatupon, Yusheng Ji; Simple Proportional Fairness Scheduling for OFDMA Frame-based Wireless Systems; Apr. 15, 2008.*

Aerohive Networks, "Optimizing Network and Client Performance Through Dynamic Airtime Scheduling," Aerohive Networks, Inc., 2011, 15 pages.

* cited by examiner

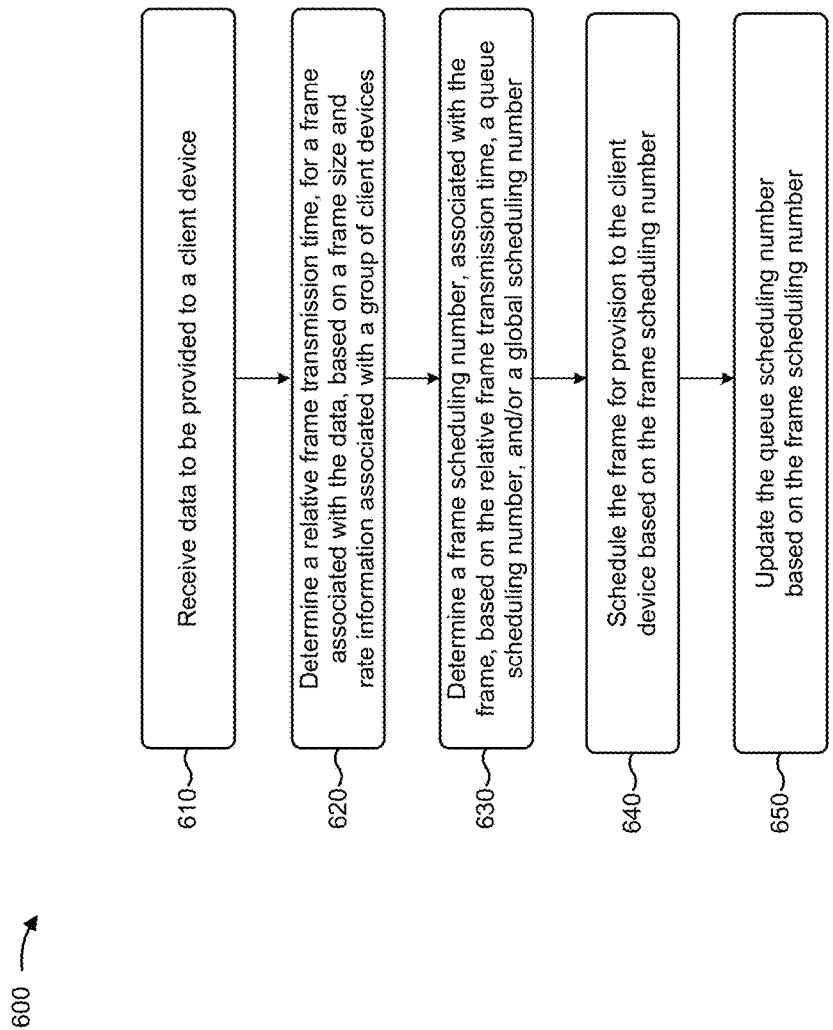

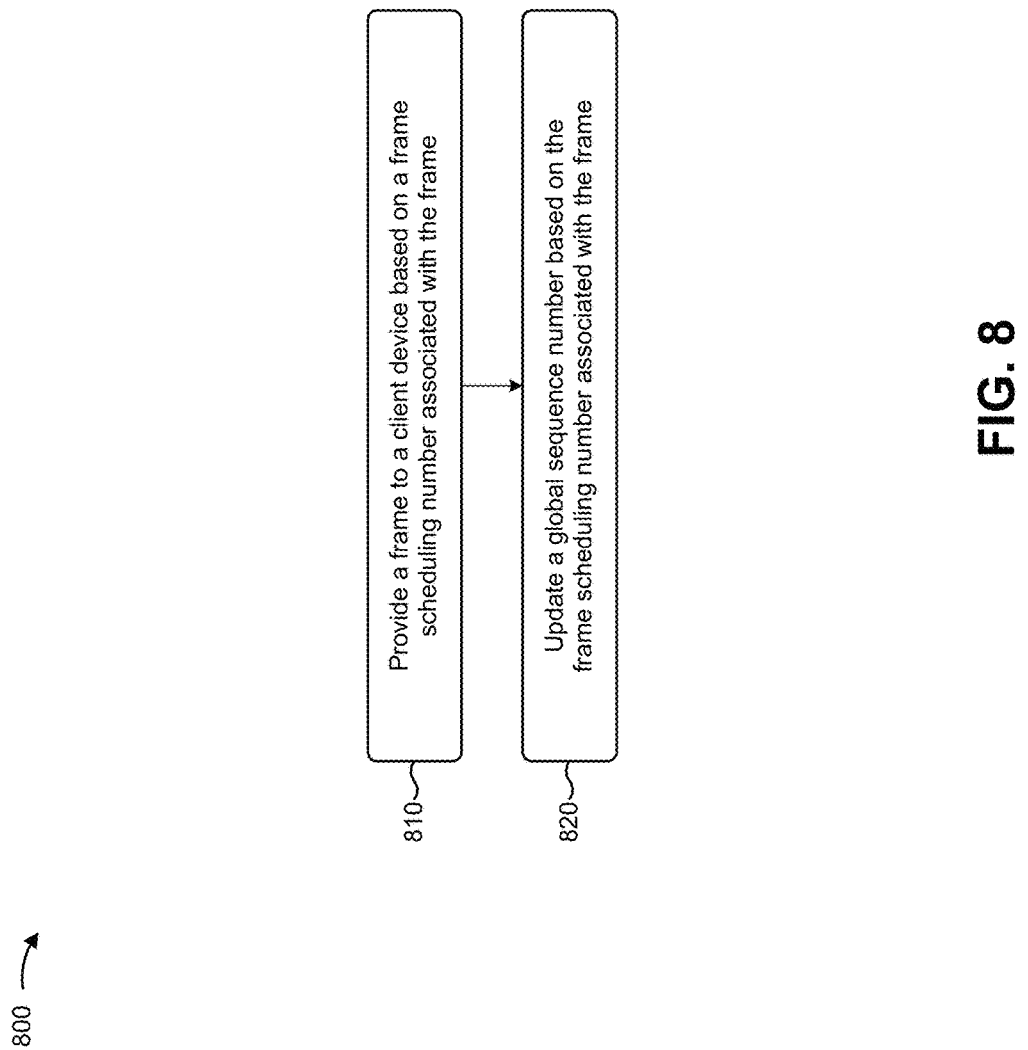

RELATIVE AIRTIME FAIRNESS IN A WIRELESS NETWORK

BACKGROUND

A wireless local area network (WLAN) may allow one or more client devices (e.g., smart phones, laptops, tablets, etc.) to connect to another network (e.g., the Internet) via an access point device. Many WLANs implement Institute of Electrical and Electronics Engineers (IEEE) 802.11 standards. A client device that implements IEEE 802.11 standards may also be referred to as a station.

SUMMARY

According to some possible implementations, a device may comprise one or more processors to: generate a frame that includes data to be provided to a client device, where the data may be associated with a data rate corresponding to the client device; determine rate information associated with a set of client devices, where the rate information may identify the data rate and one or more other data rates, where the data rate may be different than the one or more other data rates, and where the set of client devices may include the client device; determine, based on the rate information and a frame size of the frame, a relative frame transmission time (RFTT) associated with the frame; determine a frame scheduling number (FSN), associated with the frame, based on the RFTT; schedule the frame for provision to the client device based on the FSN; and provide the frame to the client device based on scheduling the FSN, where the frame may be provided to cause relative airtime fairness between a first group of frames, corresponding to the data rate, and a second group of frames, corresponding to the one or more other data rates, to be achieved, where the first group of frames may include the frame.

According to some possible implementations, a computer-readable medium may store instructions that, when executed by one or more processors, cause the one or more processors to: receive a frame that includes data to be provided to a client device, where the data may be associated with a data rate corresponding to the client device; determine rate information associated with a group of client devices, where the rate information may include the data rate and one or more other data rates, where the data rate may be different than the one or more other data rates, and where the set of client devices may include the client device; determine a relative frame transmission time (RFTT) associated with the frame, where the RFTT may be determined based on the rate information and a frame size of the frame; determine a frame scheduling number (FSN) associated with the frame, where the FSN may be determined based on the RFTT; schedule the frame for provision to the client device, where the frame may be scheduled based on the FSN; and provide the frame to the client device after scheduling the frame, where the frame may be provided such that relative airtime fairness between a first set of frames, associated with the data rate, and a second set of frames, associated with the one or more other data rates, is achieved, where the first set of frames may include the frame.

According to some possible implementations, a method may include: obtaining, by a device, a frame to be provided to a client device, where the frame may include data associated with a data rate corresponding to the client device; determining, by the device, rate information associated with a set of client devices, where the rate information may identifying the data rate and one or more other data rates, and where the set of client devices may include the client device; computing, by the device and based on the rate information and a frame size of the frame, a relative frame transmission time (RFTT) associated with the frame; determining, by the device, a queue scheduling number (QSN) associated with a queue that corresponds to the data rate; determining, by the device, a global scheduling number (GSN) associated with the device; computing, by the device, a frame scheduling number (FSN) associated with the frame, where the FSN may be computed based on the RFTT, the QSN, and the GSN; scheduling, by the device and based on the FSN, the frame for provision to the client device; and providing, by the device, the frame to the client device, where the frame may be scheduled and provided such that relative airtime fairness between a first group of frames, corresponding to the data rate, and a second group of frames, corresponding to the one or more other data rates, is achieved, where the first group of frames may include the frame.

BRIEF DESCRIPTION OF THE DRAWINGS

FIG. 6 is a flow chart of an example process for determining a frame scheduling number, associated with a frame to be provided to a client device, and scheduling the frame based on the frame scheduling number in order to ensure airtime fairness;

FIG. 8 is a flow chart of an example process for providing a frame based on a frame scheduling number associated with the frame;

DETAILED DESCRIPTION

The following detailed description of example implementations refers to the accompanying drawings. The same reference numbers in different drawings may identify the same or similar elements.

A client device may connect to an access point (AP) device (e.g., included in a WLAN) in order to allow the client device to receive data provided by one or more other devices. However, multiple client devices may connect to the AP device and, in some cases, the rate at which the client devices are assigned to receive data may vary. For example, a first client device may connect to the AP device and may be configured to receive data at a first rate (e.g., 4 megabits per second (Mbps)), a second client may connect to the AP device and may be configured to receive data at a second rate (e.g., 10 Mbps), a third client device may connect to the AP device and may be configured to receive data at a third rate (e.g., 30 Mbps), and so on. Additionally, in some implementations, a client device may be configured to receive data at multiple different rates. For example, the client device may be configured to receive data, associated with a first application (e.g., a voice over internet protocol (VoIP) application), at a higher rate than the client device is configured to receive data associated with a second application (e.g., a video streaming application). As such, the AP device may be required to generate and schedule frames (e.g., that include the data) such that the data is provided to the multiple client devices at the multiple rates.

However, a typical rate based frame scheduling mechanism may rely only on frame sizes and quantities of frames to be provided to client devices when scheduling the frames for provision to the client devices. As such, the AP device may not take into account airtime for the frames associated with each rate. In order to ensure airtime fairness for a mixed rate WLAN, the AP device may schedule the airtime dynamically between each client device to the AP device. However, the logic to dynamically schedule frames in order to ensure airtime fairness may become complex due to multiple variable parameters, such as the number of client devices connected to the AP device, mixed rates among the client devices, a quantity of frames to be provided, sizes of the frames, or the like.

Implementations described herein may allow an AP device to assign frame scheduling numbers (FSNs) to frames that include data that is to be provided at two or more rates, schedule the frames based on the FSNs, and provide the frames based on the frame schedule such that airtime fairness, associated with the providing the data at the two or more rates, is achieved.

Figure 1A:
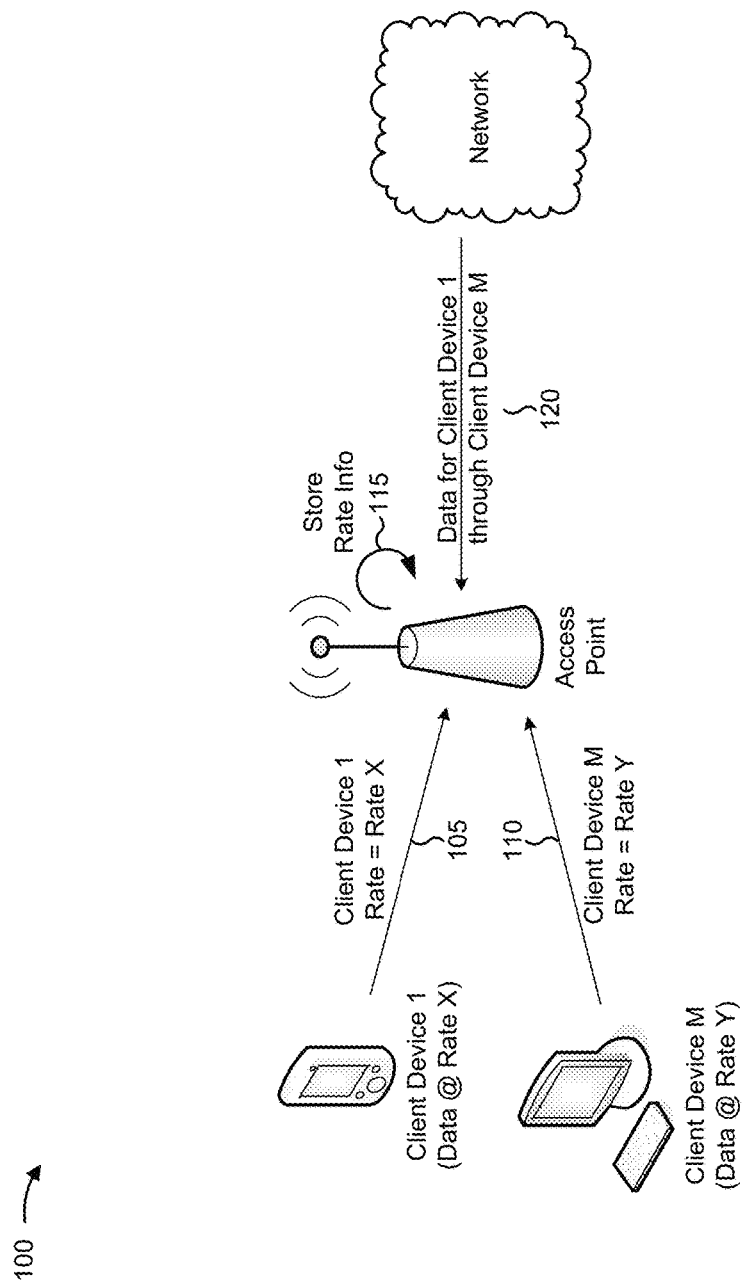
FIGS. 1A and 1B are diagrams of an overview of an example implementation described herein.
Figure 1B:
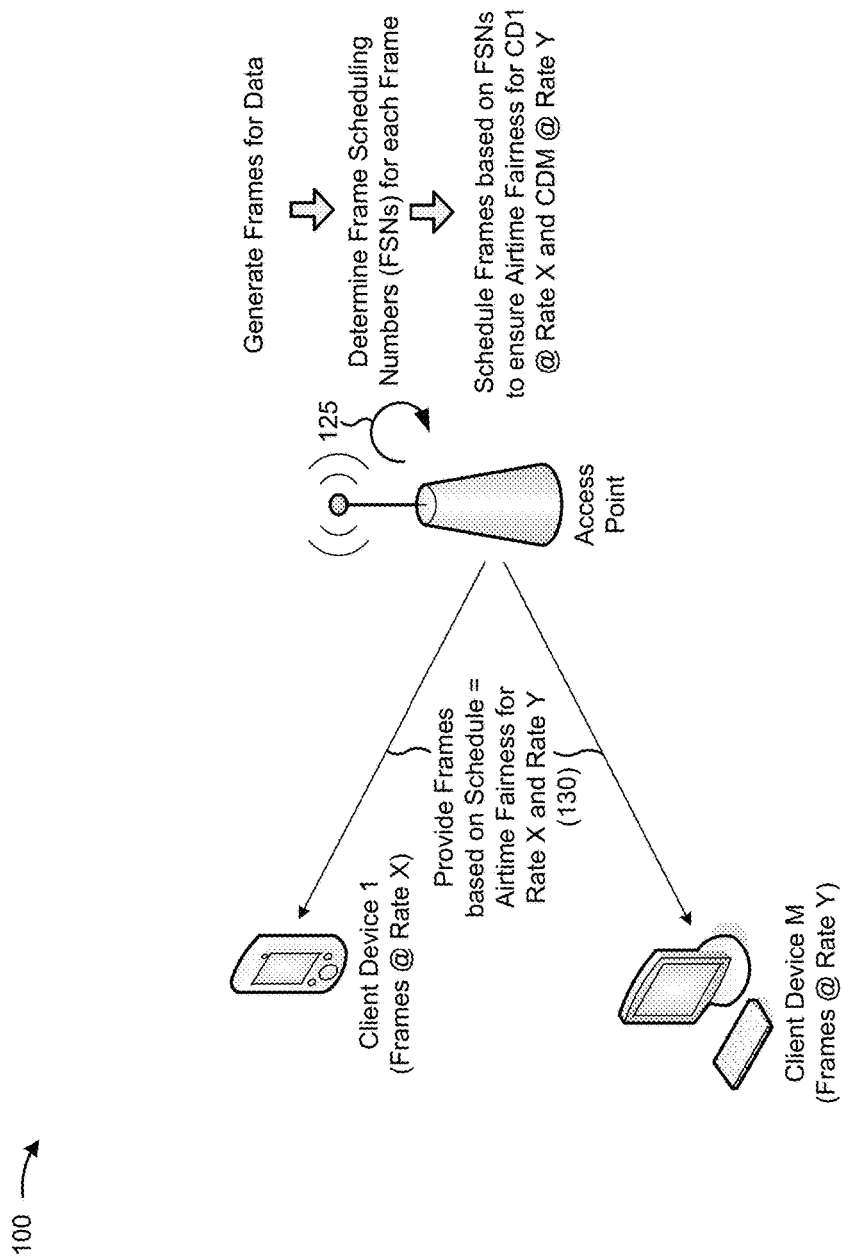

FIGS. 1A and 1B are diagrams of an overview of an example implementation 100 described herein. For the purposes of example implementation 100, assume that a group of client devices (e.g., client device 1 through client device M) is connected to an AP device, included in a WLAN, such that the client devices may receive frames provided via a network. Further, assume that each client device is to receive data at a different rate (e.g., client device 1 is configured to receive data at rate X, client device M is configured to receive data at rate Y, etc.).

As shown in FIG. 1A, and by reference number 105, client device 1 may connect to the AP device, and may provide, to the AP device, information identifying the rate (e.g., rate X) at which client device 1 is to receive data destined for client device 1. As shown by reference number 110, client device M may connect to the AP device and may provide, to the AP device, information identifying the rate (e.g., rate Y) at which client device M is to receive data destined for client device M. As shown by reference number 115, the AP device may store the rate information associated with client device 1 and client device M. As shown by reference number 120, assume that the AP device receives (e.g., via the network) data that is to be provided to client device 1 and data that is to be provided to client device M.

As shown in FIG. 1B, and by reference number 125, the AP device may receive the data, may generate frames that include the data associated with each client device, and may determine a frame scheduling number (FSN) for each frame. In some implementations, the AP device may determine the FSN based on a frame size of the frame generated by the AP device, the client device 1 rate information, the client device M rate information, and/or other scheduling information (e.g., a client device 1 queue scheduling number, a client device M queue scheduling number, a global scheduling number, etc.) stored or accessible by the AP device. As shown, the AP device may then schedule frames based on the FSNs in order to ensure airtime fairness between frames provided to client device 1 and frames provided to client device M. As shown by reference number 130, the AP device may provide the frames based on the frame schedule such that airtime fairness is achieved.

In this way, an AP device may assign FSNs to frames to be provided at two or more rates, may schedule the frames based on the FSNs, and may provide the frames based on the frame schedule such that airtime fairness, associated with the providing the frames at the two or more rates, is achieved.

Figure 2:
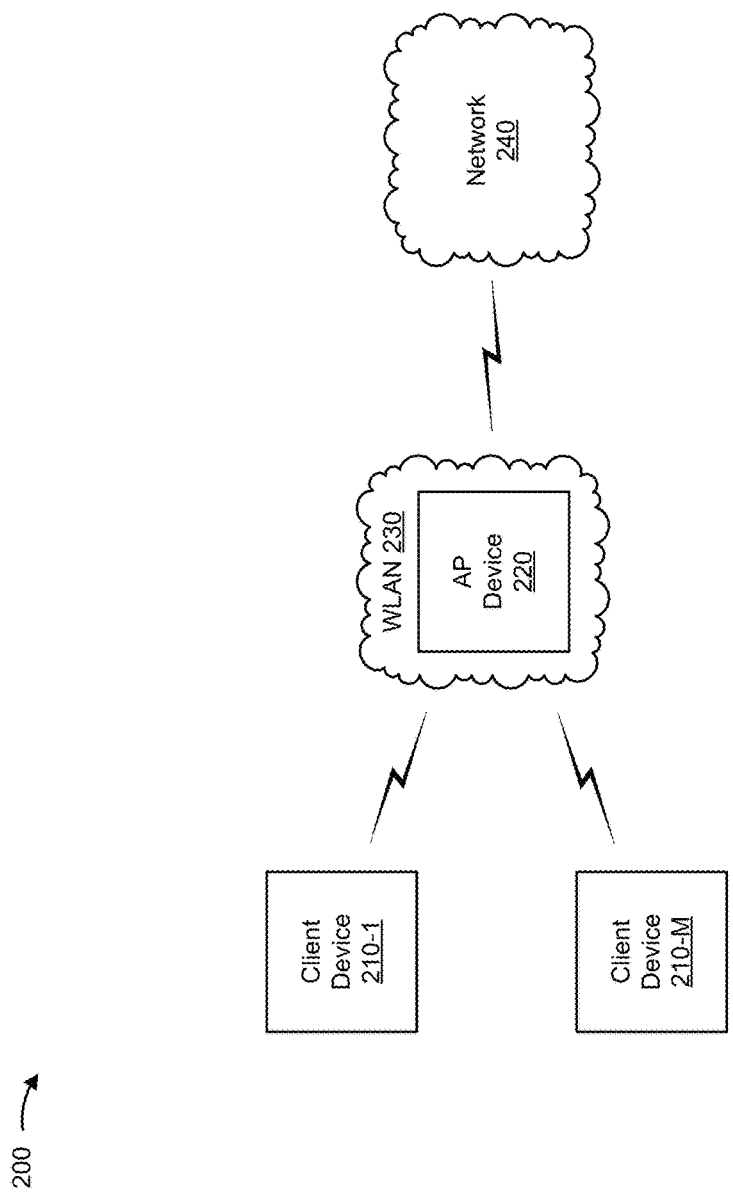
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-M (M≥1) (hereinafter referred to collectively as client devices 210, and individually as client device 210), an AP device 220, a WLAN 230, and a network 240. Devices of environment 200 may interconnect via wired connections, wireless connections, or a combination of wired and wireless connections.

Client device 210 may include a device capable of receiving, generating, storing, processing, and/or providing data via AP device 220 included in a WLAN 230. For example, client device 210 may include a communications and/or computing device, such as a mobile phone (e.g., a smart phone, a radiotelephone, etc.), a laptop computer, a tablet computer, a handheld computer, a gaming device, or a similar device. In some implementations, client device 210 may be capable of receiving, determining, and/or providing information that identifies a rate at which client device 210 is to receive data via WLAN 230. In some implementations, client device 210 may also be referred to as a station (e.g., when client device 210, AP device 220, and WLAN 230 are configured to implement IEEE 802.11 standards).

AP device 220 may include a device capable of allowing client device 210 to communicate with one or more devices via WLAN 230. For example, AP device 220 may include a router, a gateway, a modem, a switch, and/or another type of device that allows client device 210 to communicate, via WLAN 230, with one or more other client devices 210 and/or one or more devices included in network 240. In some implementations, AP device 220 may be included in WLAN 230. In some implementations, AP device 220 may be configured to implement IEEE 802.11 standards.

In some implementations, AP device 220 may be capable of receiving, determining, and/or storing rate information, associated with one or more client devices 210. Additionally, or alternatively, AP device 220 may be capable of receiving data, to be provided to the one or more client devices 210, generating frames that include the data, and scheduling the frames to ensure airtime fairness relative to the rate information. In some implementations, AP device 220 may include a rate controller component (e.g., associated with determining the rate information), a fairness controller component (e.g., associated with scheduling the frames), and/or a scheduler component (e.g., associated with providing the frames based on the frame schedule).

WLAN 230 may include one or more wireless local area networks (e.g., a WiFi network), a data network, a wireless ad hoc network, or another similar type of network. In some implementations, WLAN 230 may allow client device 210 to receive data from another device (e.g., another client device 210, a device included in network 240, etc.). In some implementations, WLAN 230 may include one or more network devices, such as one or more AP devices 220, that permit communication between WLAN 230 and other devices and/or networks included in network 240. In some implementations, WLAN 230 may also be referred to as an 802.11 network (e.g., when client device 210, AP device 220, and WLAN 230 are configured to implement IEEE 802.11 standards). While the description herein describes AP device 220 as being included in WLAN, AP device 220 could be included in another type of wireless network, such as a wireless wide area network, a cellular network, or the like.

Network 240 may include one or more wired and/or wireless networks. For example, network 240 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
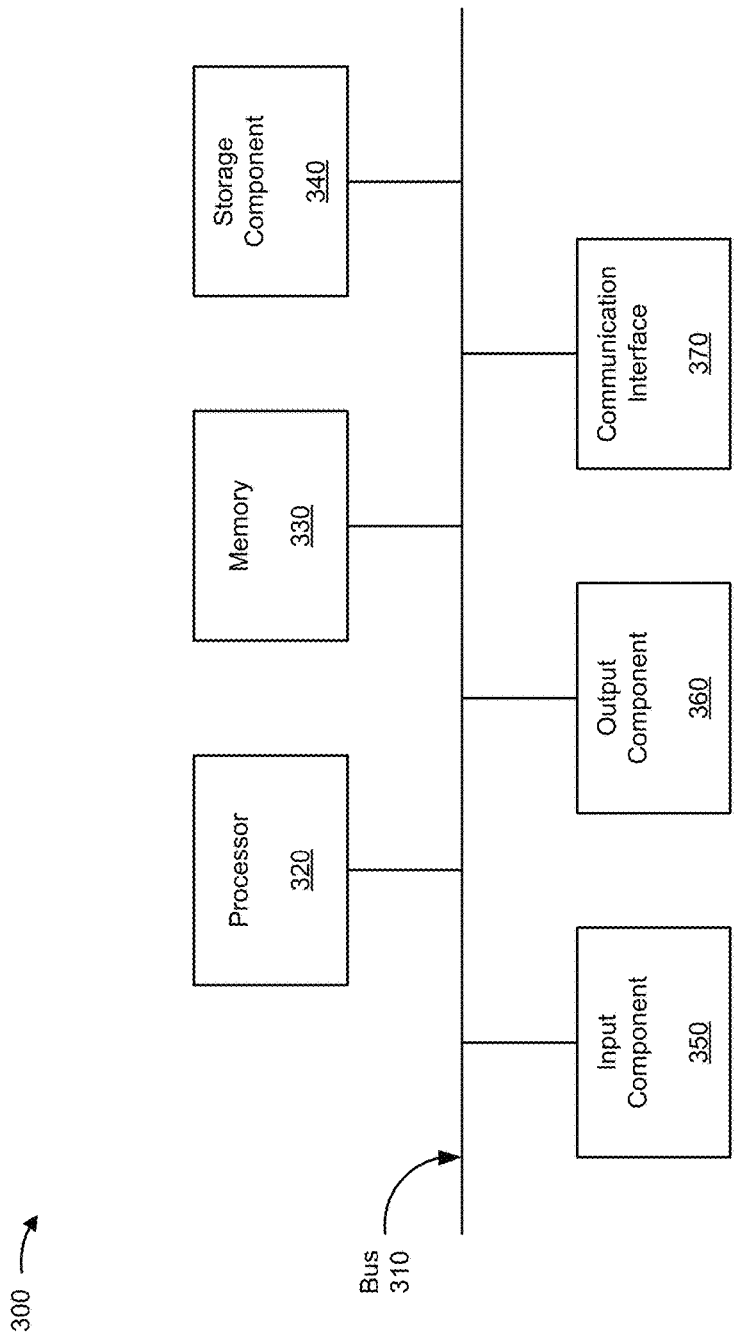
FIG. 3 is a diagram of example components of one or more devices of FIG. 2.

FIG. 3 is a diagram of example components of a device 300. Device 300 may correspond to client device 210 and/or AP device 220. In some implementations, client device 210 and/or AP device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
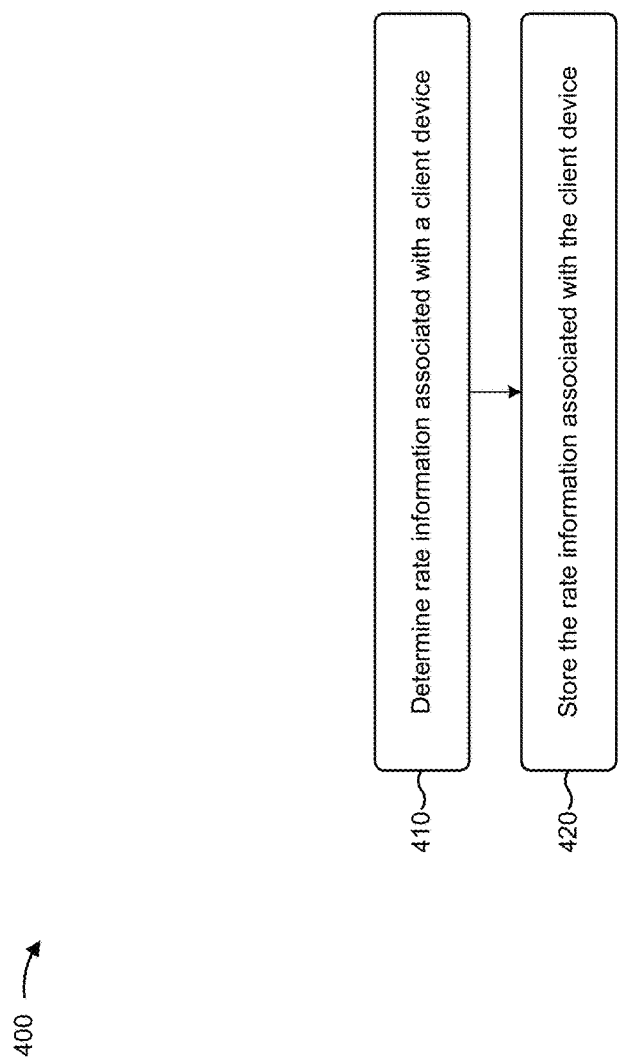
FIG. 4 is a flow chart of an example process for receiving and storing rate information associated with a client device.

FIG. 4 is a flow chart of an example process 400 for receiving and storing rate information associated with a client device. In some implementations, one or more process blocks of FIG. 4 may be performed by AP device 220. In some implementations, one or more process blocks of FIG. 4 may be performed by another device or a group of devices separate from or including AP device 220, such as one or more other devices included in WLAN 230.

As shown in FIG. 4, process 400 may include determining rate information associated with a client device (block 410). For example, AP device 220 may determine rate information associated with client device 210. In some implementations, AP device 220 may determine the rate information when client device 210 connects to AP device 220. Additionally, or alternatively, AP device 220 may determine the rate information at another time (e.g., when client device 210 provides the rate information to AP device 220 after client device 210 connects to AP device 220).

Rate information may include information that identifies a rate at which client device 210 is to receive data provided via AP device 220. In some implementations, the rate information may be associated with a particular traffic class, identified in a quality of service (QoS) policy associated with client device 210, that identifies a rate at which data is to be provided to client device 210. A traffic class may be used to classify a particular client device 210 and/or a group of client devices 210 (e.g. a gold group, a silver group, a platinum group, etc.) based on different access categories and/or other parameters associated with the particular client device 210 and/or the group of client devices 210. In some implementations, the rate information may identify a single rate associated with client device 210. For example, the rate information may identify a single rate (e.g., 10 Mbps for all data) when client device 210 is configured to receive all data at a single rate (e.g., when AP device 220 implements a flat QoS policy). Alternatively, the rate information may identify multiple rates associated with client device 210. For example, the rate information may identify a first rate (e.g., 10 Mbps) for data associated with a first type of service (e.g., a VoIP service), a second rate (e.g., 4 Mbps) for data associated with a second type of service (e.g., a video streaming service), and so on (e.g., when AP device 220 implements a hierarchical QoS policy).

In some implementations, AP device 220 may determine the rate information when client device 210 connects to AP device 220. For example, AP device 220 may communicate with client device 210 in order to allow client device 210 to connect to AP device 220, and AP device 220 may determine (e.g., based on information provided by client device 210) the rate information during establishment of the connection. Additionally, or alternatively, AP device 220 may determine the rate information at another time (e.g., when client device 210 is configured to provide rate information to AP device 220 periodically or after establishing a connection with AP device 220).

In some implementations, AP device 220 may determine updated rate information. For example, AP device 220 may determine first rate information, associated with client device 210, that identifies a first rate. Here, AP device 220 may receive channel quality information from client device 210 (e.g., while client device 210 is connected to AP device 220), and may determine, based on the channel quality information, second rate information that identifies a second rate (e.g., an updated rate) at which client device 210 is to receive data that differs from the first rate. In some implementations, AP device 220 may determine rate information and/or update rate information associated with multiple client devices 210 connected to AP device 220.

In some implementations, when AP device 220 determines updated rate information, AP device 220 may determine updated relative frame transmission times associated with one or more rates (e.g., in the manner described below). In this way, updated rate information may act as a trigger that causes AP device 220 to dynamically adapt to changing rate information in order to maintain airtime fairness.

As further shown in FIG. 4, process 400 may include storing the rate information associated with the client device (block 420). For example, AP device 220 may store the rate information associated with client device 210. In some implementations, AP device 220 may store the rate information when AP device 220 determines the rate information (e.g., after AP device 220 determines the rate information). Additionally, or alternatively, AP device 220 may store the rate information based on receiving an indication that AP device 220 is to store the rate information.

In some implementations, AP device 220 may store the rate information in a memory location (e.g., a RAM, a ROM, a cache, a hard disk, etc.) of AP device 220. In some implementations, AP device 220 may store the rate information in a rate information data structure stored or accessible by AP device 220. Additionally, or alternatively, AP device 220 may provide the rate information to another device for storage.

In some implementations, AP device 220 may store the rate information, associated with client device 210, such that previous rate information (e.g., associated with client device 210 and received at an earlier time) is updated, overwritten, and/or deleted. Additionally, or alternatively, AP device 220 may store the rate information such that AP device 220 may retrieve the rate information at a later time. In some implementations, AP device 220 may store the rate information with respect to client device 210. Additionally, or alternatively, AP device 220 may store the rate information with respect to a QoS policy, a traffic class, and/or a rate identified in the rate information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
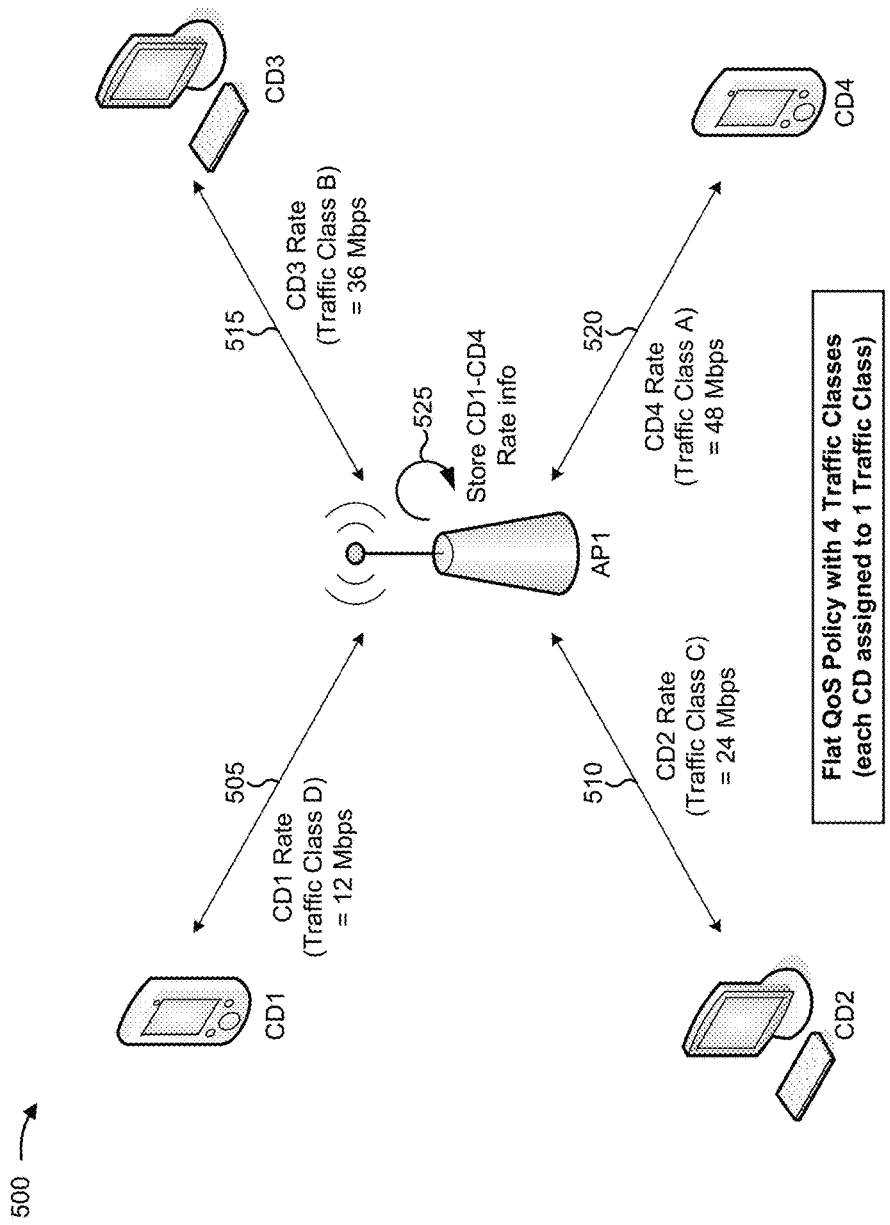
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that AP device 220 (e.g., AP1), associated with WLAN 230, is configured to implement a flat QoS policy that identifies four rates (e.g., 48 Mbps, 36 Mbps, 24 Mbps, and 12 Mbps) that correspond to four respective traffic classes (e.g., traffic class A, traffic class B, traffic class C, and traffic class D). Further, assume that a first client device 210 (e.g., CD1) is assigned to traffic class D, a second client device 210 (e.g., CD2) is assigned to traffic class C, a third client device 210 (e.g., CD3) is assigned to traffic class B, and a fourth client device 210 (e.g., CD4) is assigned to traffic class A.

As shown in FIG. 5, and by reference number 505, CD1 may provide (e.g., when connecting to AP1) rate information indicating that CD1 is to receive data at a rate of 12 Mbps (e.g., since CD1 is assigned to traffic class D). As shown by reference number 510, CD2 may provide rate information indicating that CD2 is to receive data at a rate of 24 Mbps (e.g., since CD2 is assigned to traffic class C). As shown by reference number 515, CD3 may provide rate information indicating that CD3 is to receive data at a rate of 36 Mbps (e.g., since CD3 is assigned to traffic class B). As shown by reference number 520, CD4 may provide rate information indicating that CD4 is to receive data at a rate of 48 Mbps (e.g., since CD4 is assigned to traffic class A). As shown by reference number 525, AP1 may store the rate information, associated with CD1 through CD4, in order to allow AP1 to schedule frames, to be provided to CD1 through CD4, such that airtime fairness for each traffic class is achieved, as described below.

As indicated above, FIG. 5 is provided merely as an example. Other examples are possible and may differ from what was described with regard to FIG. 5.

FIG. 6 is a flow chart of an example process 600 for determining a frame scheduling number, associated with a frame to be provided to a device, and scheduling the frame based on the frame scheduling number in order to ensure airtime fairness. In some implementations, one or more process blocks of FIG. 6 may be performed by AP device 220. In some implementations, one or more process blocks of FIG. 6 may be performed by another device or a group of devices separate from or including AP device 220, such as another device included in WLAN 230.

As shown in FIG. 6, process 600 may include receiving data to be provided to a client device (block 610). For example, AP device 220 may receive data to be provided to client device 210. In some implementations, AP device 220 may receive the data when another device provides the data, such as another client device 210, a device included in or communicating via WLAN 230, or a device included in or communicating via network 240.

In some implementations, AP device 220 may receive the data, and may generate a frame that includes the data. In some implementations, AP device 220 may determine (e.g., based on information stored or accessible by AP device 220) a frame size for the frame. In some implementations, AP device 220 may generate multiple frames such that the data is divided into multiple frames of the frame size. A frame may include a data transmission unit that includes data that is to be provided to client device 210. In some implementations, the frame may include information that identifies client device 210 to which the frame is to be provided. Additionally, or alternatively, the frame may include information that identifies a particular service (e.g., a VoIP service, a video streaming service, a web surfing service, etc.) or a particular class of service.

In some implementations, AP device 220 may add the frame to a queue associated with client device 210 and the rate. For example, AP device 220 may receive data to be provided to client device 210 at a particular rate, may generate a frame that includes the data (e.g., or a portion of the data), and may add the frame to a queue (e.g., managed by AP device 220) that corresponds to the client device 210 and the particular rate. In some implementations, AP device 220 may generate multiple frames (e.g., when AP device 220 divides the data between two or more frames), and may add each of the frames to the queue. In some implementations, AP device 220 may manage multiple queues, and each queue may correspond to a particular client device 210 and a particular rate.

As further shown in FIG. 6, process 600 may include determining a relative frame transmission time, associated with the frame, based on a frame size and rate information associated with a group of client devices (block 620). For example, AP device 220 may determine a relative frame transmission time (RFTT), associated with the frame, based on a frame size and rate information associated with a group of client devices 210. In some implementations, AP device 220 may determine the RFTT after AP device 220 receives the data and generates the frame. Additionally, or alternatively, AP device 220 may determine the RFTT when AP device 220 queues the frame. Additionally, or alternatively, AP device 220 may determine the RFTT when AP device 220 receives information indicating that AP device 220 is to determine the RFTT.

A relative frame transmission time, associated with a frame to be provided to client device 210, may include timing information, associated with providing the frame to client device 210, in relation to other frames to be provided to client device 210 and/or other client devices 210. In some implementations, the RFTT may be a value (e.g., a numerical value). In some implementations, AP device 220 may determine the RFTT based on a frame size of the frame. Additionally, or alternatively, AP device 220 may determine the RFTT based on a rate at which data is to be provided to client device 210, another rate at which other data is to be provided to client device 210, and/or a rate at which data is to be provided to other client devices 210. In some implementations, AP device 220 may determine multiple RFTTs. For example, assume that each client device 210, of a group of client devices 210 connected to AP device 220, is to receive data at a different rate (e.g., based on a flat QoS policy). In this example, AP device 220 may determine an RFTT corresponding to each client device 210. As another example, assume that client device 210, connected to AP device 220, is to receive data, associated with a first service, at a first rate, and is to receive data, associated with a second service, at a second rate (e.g., based on a hierarchical QoS policy). In this example, AP device 220 may determine an RFTT corresponding to each rate associated with client device 210. In some implementations, AP device 220 may determine an RFTT for multiple rates (e.g., associated with a single client device 210 or associated with multiple client devices 210).

In some implementations, AP device 220 may determine the RFTT by performing a computation associated with the frame size, the rate at which data is to be provided to client device 210, another rate at which other data is to be provided to client device 210, and/or a rate at which data is to be provided to other client devices 210. In one example implementation, AP device 220 may determine the RFTT in the following manner:

(1) Summing a group of rates associated with a level of traffic classes identified in a QoS policy;
(2) Dividing the rate, associated with providing the data and included in the group of rates, by a result of (1);
(3) Repeating (1) and (2) for each level of traffic classes in the QoS policy;
(4) Multiplying all results of (2) that correspond to each level of traffic classes;
(5) Multiplying a result of (4) by 100; and
(6) Dividing the frame size by a result of (5).

In some implementations, AP device 220 may determine the RFTT using a different technique.

In some implementations, AP device 220 may store the RFTT in a memory location of AP device 220 (e.g., such that AP device 220 does not need to determine the RFTT for a next frame to be provided to client device 210). In some implementations, AP device 220 may determine an updated RFTT (e.g., when AP device 220 receives updated rate information associated with client device 210).

As further shown in FIG. 6, process 600 may include determining a frame scheduling number, associated with the frame, based on the relative frame transmission time, a queue scheduling number, and/or a global scheduling number (block 630). For example, AP device 220 may determine a frame scheduling number (FSN), associated with the frame, based on the RFTT, a queue scheduling number (QSN), and/or a global scheduling number (GSN). In some implementations, AP device 220 may determine the FSN after AP device 220 determines the RFTT. Additionally, or alternatively, AP device 220 may determine the FSN when AP device 220 generates the frame.

A frame scheduling number may include a value assigned to a frame to be provided to client device 210 at a particular rate. In some implementations, AP device 220 may schedule the frame for provision to client device 210 based on the FSN, as described below. A QSN may include an FSN corresponding to a previously scheduled frame (e.g., a most recently scheduled frame) associated with a queue corresponding to the rate and client device 210. A GSN may include an FSN corresponding to a previously provided frame (e.g., a most recent frame provided by AP device 220).

In some implementations, AP device 220 may determine the FSN based on the RFTT associated with the frame, a QSN associated with a queue in which the frame is placed, and/or a GSN associated with AP device 220. In some implementations, AP device 220 may determine the FSN by performing a computation associated with the RFTT, the QSN, and the GSN. In one example implementation, AP device 220 may determine the FSN in the following manner:

(1) Identifying a maximum of the QSN and the GSN; and
(2) Adding a result of (1) to the RFTT.

In some implementations, AP device 220 may determine the FSN using a different technique.

As further shown in FIG. 6, process 600 may include scheduling the frame for provision to the client device based on the frame scheduling number (block 640). For example, AP device 220 may schedule the frame for provision to client device 210 based on the FSN. In some implementations, AP device 220 may schedule the frame after AP device 220 determines the FSN. Additionally, or alternatively, AP device 220 may schedule the frame when AP device 220 receives information indicating that AP device 220 is to schedule the frame.

In some implementations, AP device 220 may schedule the frame based on a frame schedule stored or accessible by AP device 220. For example, AP device 220 may store or access a frame schedule (e.g., a logarithmic array of arrays where higher arrays represent buckets with larger granularity) that includes a group of FSNs, associated with a group of frames to be provided to client devices 210, and AP device 220 may add the FSN to the schedule. In some implementations, AP device 220 may schedule the frame such that the frame schedule is ordered based on FSNs corresponding to scheduled frames (e.g., from a smallest FSN value to a largest FSN value, from a largest FSN value to a smallest FSN value, etc.). In some implementations, AP device 220 may schedule the frame based on the FSN (e.g., such that the frame schedule is ordered from a smallest FSN to a largest FSN). In some implementations, AP device 220 may schedule the frame such that the frame is provided based on the FSN, as described below.

As further shown in FIG. 6, process 600 may include updating the queue scheduling number based on the frame scheduling number (block 650). For example, AP device 220 may update the QSN based on the FSN. In some implementations, AP device 220 may update the QSN after AP device 220 schedules the frame. Additionally, or alternatively, AP device 220 may update the QSN after AP device 220 determines the FSN. Additionally, or alternatively, AP device 220 may update the QSN when AP device 220 receives information indicating that AP device 220 is to update the QSN.

In some implementations, AP device 220 may update the QSN based on the FSN. In some implementations, AP device 220 may update the QSN each time AP device 220 determines an FSN for a frame placed in the queue. For example, AP device 220 may determine (e.g., based on an RFTT, a QSN, and/or a GSN) a first FSN for a first frame placed in a queue, and may update the QSN such that the QSN is a value equal to the first FSN. In this example, when AP device 220 determines a second FSN for a second frame placed in the queue, AP device 220 may determine the second FSN based on the updated QSN (e.g., the first FSN). AP device 220 may then update the QSN such that the QSN is a value equal to the second FSN. In this way, AP device 220 may update the QSN each time a frame, associated with the queue that corresponds to the QSN, is scheduled. Additionally, or alternatively, AP device 220 may update the QSN based on a QSN threshold. For example, AP device 220 may be configured to reset the QSN (e.g., set the QSN equal to zero) when the QSN reaches a QSN threshold stored or accessible by AP device 220. Additionally, or alternatively, AP device 220 may update (e.g., reset) the QSN when there are no frames to be processed by AP device 220 (e.g., during idle time).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
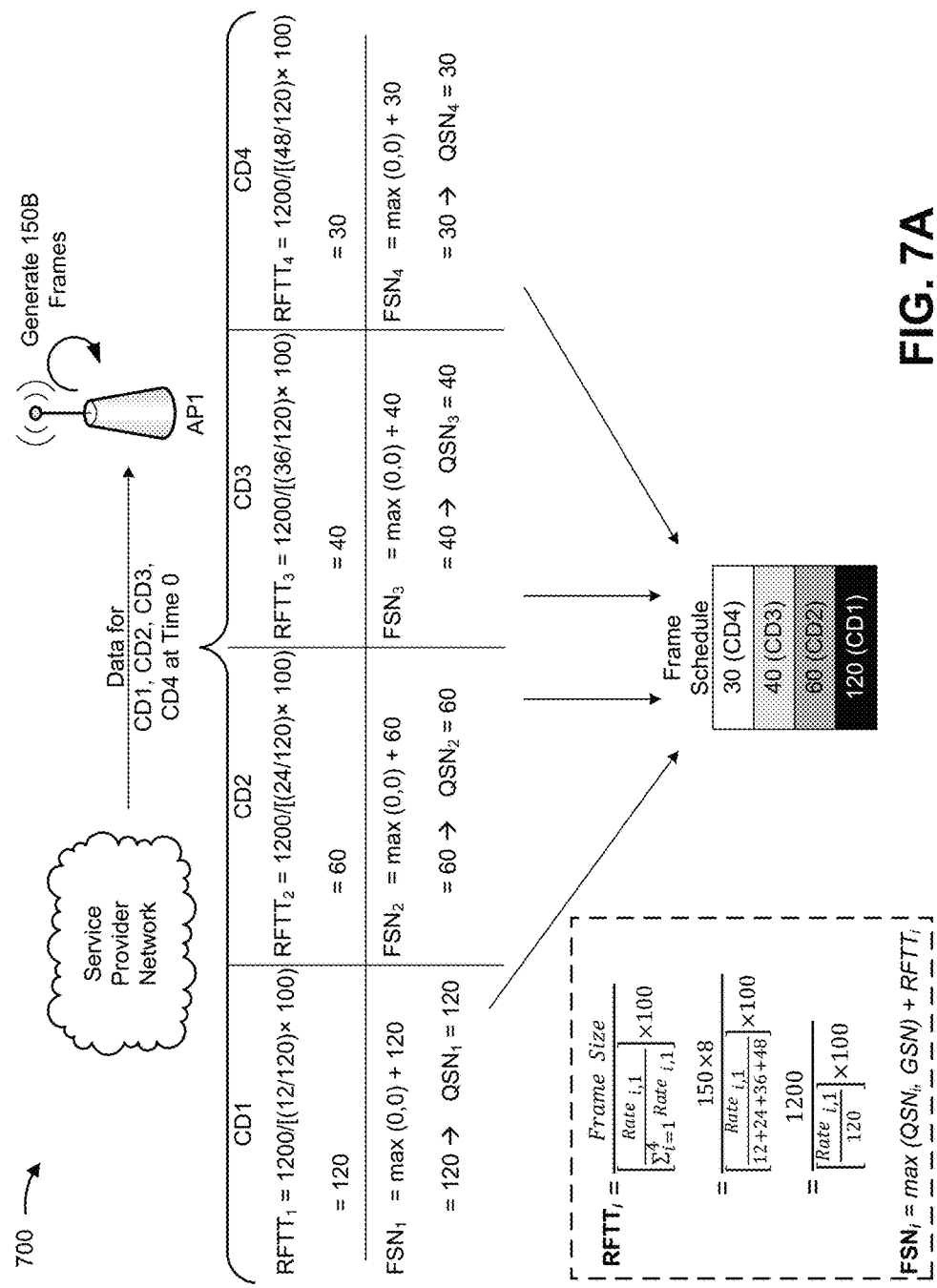
FIGS. 7A-7C are diagrams of an example implementation relating to the example process shown in FIG. 6.
Figure 7B:
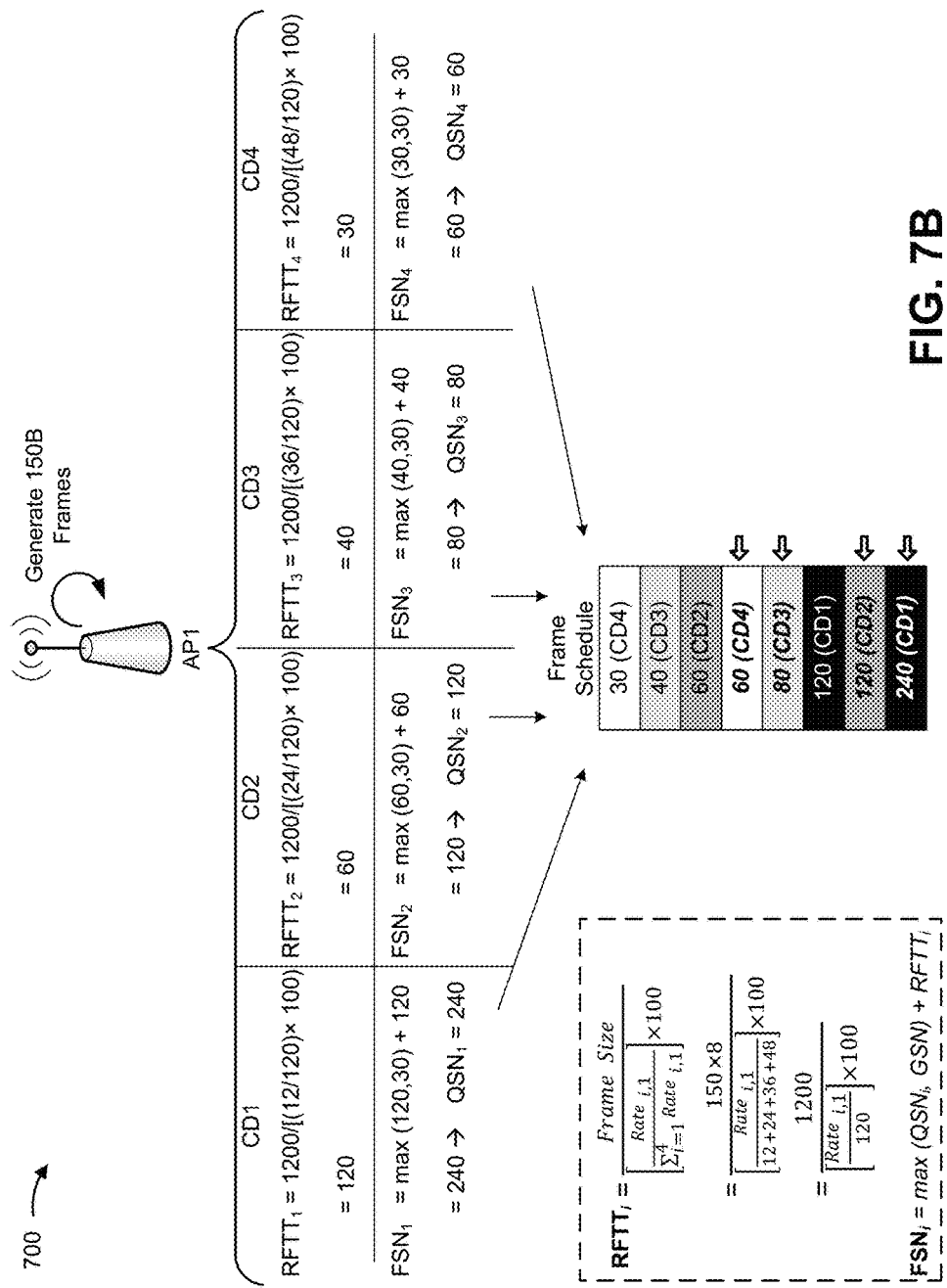
Figure 7C:
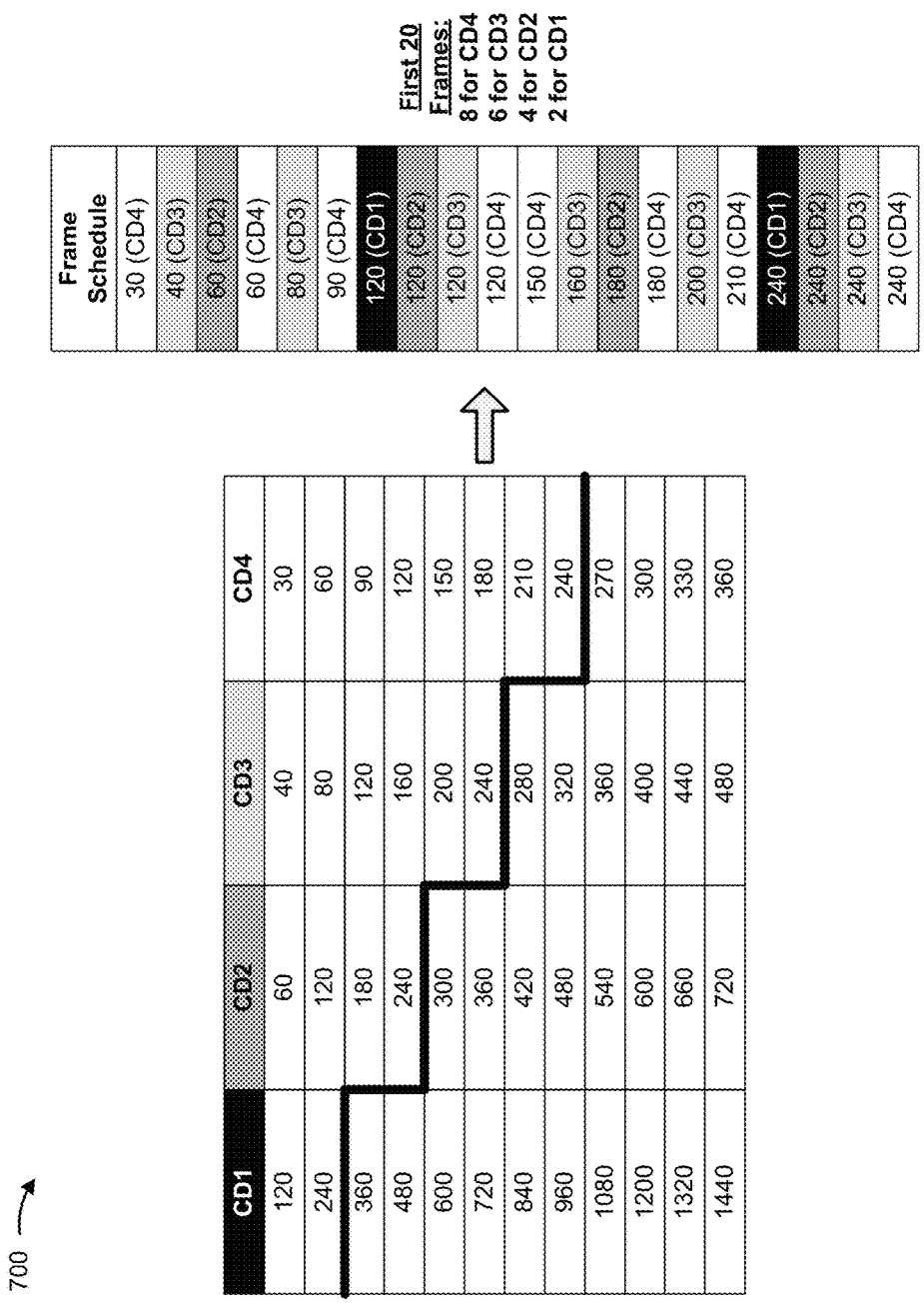

FIGS. 7A-7C are diagrams of an example implementation 700 relating to example process 600 shown in FIG. 6. For the purposes of example implementation 700, assume that four client devices 210 (e.g., CD1 through CD4) are connected to AP device 220 (e.g., AP1), and that AP1 stores rate information indicating that data is to be provided to the four client devices 210 in accordance with a flat QoS policy (e.g., a one level QoS policy) at the following rates: 12 Mbps to CD1, 24 Mbps to CD2, 36 Mbps to CD3, and 48 Mbps to CD4. Finally, assume that AP1 is to provide the data to each client device 210 in frames of a frame size equal to 150 bytes (B).

As shown in FIG. 7A, at a first time unit (e.g., time 0), AP1 may receive data destined for CD1 through CD4, and may generate a first set of frames of frame size 150B (e.g., each frame, of the first set of frames, corresponding to data to be provided to each client device 210). As further shown, AP1 may determine (e.g., based on the 150B frame size and the rate information associated with each client device 210) an RFTT corresponding to the CD1 rate (e.g., $RFTT_1=1200/[(12/120)\times 100]=120$), an RFTT corresponding to the CD2 rate (e.g., $RFTT_2=1200/[(24/120)\times 100]=60$), an RFTT corresponding to the CD3 rate (e.g., $RFTT_3=1200/[(36/120)\times 100]=40$), and an RFTT corresponding to the CD4 rate (e.g., $RFTT_4=1200/[(48/120)\times 100]=30$).

As further shown, AP1 may determine an FSN for each frame, of the first set of frames, to be provided to each client device 210 (e.g., based on a corresponding RFTT, a corresponding QSN, and a GSN). For the purposes of FIG. 7A, assume that a QSN corresponding to a queue (e.g., managed by AP device 220) associated with each client device 210 is equal to zero (e.g., since AP1 has not scheduled any frames) and that a GSN associated with AP1 is equal to zero (e.g., since AP1 has not provided any frames). As shown, AP1 may determine an FSN for the first frame to be provided to CD1 (e.g., $FSN_1=\max(0,0)+120=120$), an FSN for the first frame to be provided to CD2 (e.g., $FSN_2=\max(0,0)+60=60$), an FSN for the first frame to be provided to CD3 (e.g., $FSN_3=\max(0,0)+40=40$), and an FSN for the first frame to be provided to CD4 (e.g., $FSN_4=\max(0,0)+30=30$).

As further shown, AP1 may then schedule the first set of frames (e.g., each first frame to be provided to a respective client device 210) based on the FSN for each frame. As shown, AP1 may schedule the frames for provision in order based on the FSNs as follows: the first frame for CD4 (e.g., $FSN_4=30$), the first frame for CD3 (e.g., $FSN_3=40$), the first frame for CD2 (e.g., $FSN_2=60$), and the first frame for CD1 (e.g., $FSN_1=120$). As further shown, AP1 may then update each QSN (e.g., corresponding to each client device 210), such that each respective QSN is equal to a corresponding FSN scheduled by AP1 (e.g., $QSN_1=120$, $QSN_2=60$, $QSN_3=40$, and $QSN_4=30$).

As shown in FIG. 7B, at a next time unit (e.g., at time 1, immediately following time 0), AP1 may generate a second set of frames of frame size 150B (e.g., each frame, of the second set of frames, corresponding to data to be provided to each client device 210), and may schedule the second set of frames for provision to CD1 through CD4. For the purposes of FIG. 7B, assume that AP1 stored the RFTTs determined above, and that the frame size and the rate information has not changed (e.g., such that AP1 may use the same RFTTs for the frame scheduling at the next time unit).

As shown, AP1 may determine an FSN for each frame of the second set of frames. For the purposes of FIG. 7B, assume that the GSN associated with AP1 is equal to 30 (e.g., AP1 has provided the first scheduled frame to CD4 at time 1, as described below). As shown, AP1 may determine an FSN for the second frame to be provided to CD1 (e.g., $FSN_1=\max(120,30)+120=240$), an FSN for the second frame to be provided to CD2 (e.g., $FSN_2=\max(60,30)+60=120$), an FSN for the second frame to be provided to CD3 (e.g., $FSN_3=\max(40,30)+40=80$), and an FSN for the second frame to be provided to CD4 (e.g., $FSN_4=\max(30,30)+30=60$).

As further shown, AP1 may then schedule the second set of frames (e.g., each second frame to be provided to a respective client device 210) based on the FSN for each frame. As shown, AP1 may add the frames to the frame schedule, based on the FSNs, such that the frame schedule is as follows: the first frame for CD4 (e.g., $FSN_4=30$, already provided to CD4), the first frame for CD3 (e.g., $FSN_3=40$), the first frame for CD2 (e.g., $FSN_2=60$), the second frame for CD4 (e.g., $FSN_4=60$), the second frame for CD3 (e.g., $FSN_3=80$), the first frame for CD1 (e.g., $FSN_1=120$), the second frame for CD2 (e.g., $FSN_2=120$), and the second frame for CD1 (e.g., $FSN_1=240$). As further shown, AP1 may again update each QSN, such that each respective QSN is equal to the corresponding FSN scheduled by AP1 (e.g., $QSN_1=240$, $QSN_2=120$ $QSN_3=80$, and $QSN_4=60$).

As shown in FIG. 7C, AP1 may continue scheduling frames in the above manner (e.g., assume that the rates and the frame size do not change, and that AP1 provides a frame and updates the GSN at each time unit). FSNs for the first twelve frames, associated with each client device 210 are shown in the left portion of FIG. 7C. A frame schedule for the first twenty frames to be provided by AP1 is shown in the right portion of FIG. 7C. As shown, AP1 may schedule the first twenty frames such that eight frames are scheduled for provision to CD4, six frames are scheduled for provision to CD3, four frames are scheduled for provision to CD2, and two frames are scheduled for provision to CD1. Airtime fairness of the twenty frame schedule is demonstrated below with respect to FIG. 9.

As indicated above, FIGS. 7A-7C are provided merely as an example. Other examples are possible and may differ from what was described with regard to FIGS. 7A-7C. For example, while example implementation 700 is described with an equal number of frames (e.g., one) being generated at each time unit for each client device 210, in some implementations, the number of frames generated at each time unit may be different with respect to each client device 210. In any case, similar computations to those described herein may be equally applicable when an unequally quantity of frames is generated for each client device 210 at each time unit, when the frames are of varying frame size at each time unit, or the like.

FIG. 8 is a flow chart of an example process 800 for providing a frame based on a frame scheduling number associated with the frame. In some implementations, one or more process blocks of FIG. 8 may be performed by AP device 220. In some implementations, one or more process blocks of FIG. 8 may be performed by another device or a group of devices separate from or including AP device 220, such as another device included in WLAN 230.

As shown in FIG. 8, process 800 may include providing a frame to a client device based on a frame scheduling number associated with the frame (block 810). For example, AP device 220 may provide a frame to client device 210 based on an FSN associated with the frame. In some implementations, AP device 220 may provide the frame after AP device 220 schedules the frame. Additionally, or alternatively, AP device 220 may provide the frame after AP device 220 provides another frame (e.g., at an earlier time). Additionally, or alternatively, AP device 220 may provide the frame when AP device 220 receives information indicating that AP device 220 is to provide the frame.

In some implementations, AP device 220 may provide the frame based on a frame schedule. For example, AP device 220 may schedule frames in the manner described above, and may provide the frame based on the frame schedule. In some implementations, AP device 220 may provide the frame based on the FSN identified in the frame schedule. For example, AP device 220 may be configured to provide a frame, identified in the frame schedule, with a smallest FSN value (e.g., as compared to other FSN values in the frame schedule). In this example, AP device 220 may identify a frame with the smallest FSN value, and may provide the frame accordingly. AP device 220 may then remove the frame from the frame schedule, may identify another frame (e.g., of the frames remaining in the schedule) with the smallest FSN value, may provide the other frame, and so on. As another example, AP device 220 may be configured to provide a frame, identified in the frame schedule, with a largest FSN value (e.g., as compared to other FSN values in the frame schedule). In this example, AP device 220 may identify a frame with the largest FSN value, and may provide the frame accordingly. AP device 220 may then remove the frame from the frame schedule, may identify another frame (e.g., of the frames remaining in the schedule) with the largest FSN value, may provide the other frame, and so on.

In some implementations, two or more frames may have identical FSN values. In such a case, AP device 220 may identify a frame that was scheduled first, a frame that was scheduled second, a frame that was schedule last, or the like, and may provide the first scheduled frame for provision before the second scheduled frame, the second scheduled frame for provision before a third schedule frame, and so on.

As further shown in FIG. 8, process 800 may include updating a global sequence number based on the frame scheduling number associated with the frame (block 820). For example, AP device 220 may update a GSN based on the FSN associated with the frame. In some implementations, AP device 220 may update the GSN when AP device 220 provides the frame to client device 210. Additionally, or alternatively, AP device 220 may update the GSN when AP device 220 receives information indicating that AP device 220 is to update the GSN.

In some implementations, AP device 220 may update the frame based on the FSN associated with the frame. For example, AP device 220 may update the GSN such that the GSN is equal to the FSN of the frame provided by AP device 220. Additionally, or alternatively, AP device 220 may update the GSN based on a GSN threshold. For example, AP device 220 may be configured to reset the GSN (e.g., set the GSN equal to zero) when the GSN reaches a GSN threshold stored or accessible by AP device 220. Additionally, or alternatively, AP device 220 may update (e.g., reset) the GSN when there are no frames to be processed by AP device 220 (e.g., during idle time).

In some implementations, AP device 220 may provide the frame, update the GSN, and repeat process 800 for the next frame in the schedule. In this way, AP device 220 may provide multiple frames to multiple client devices 210, and may update the GSN accordingly.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
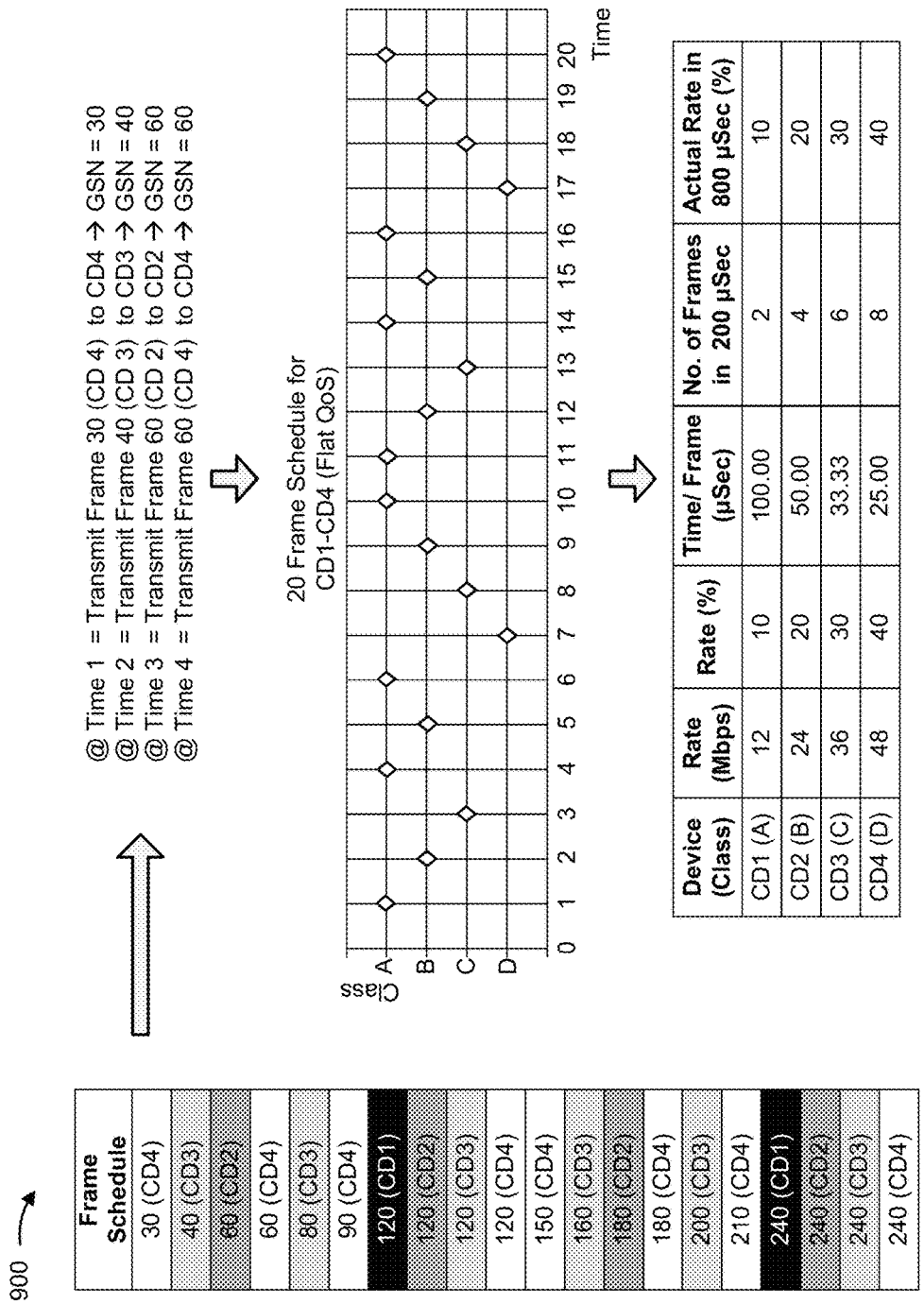
FIG. 9 is a diagram of an example implementation relating to the example process shown in FIG. 8.

FIG. 9 is a diagram of an example implementation 900 relating to example process 800 shown in FIG. 8. For the purposes of example implementation 900, assume that AP device 220 (e.g., AP1) has scheduled twenty frames, to be provided to a group of client devices 210, based on FSNs determined for each frame. Further, assume that AP device 220 provides one frame at each time unit.

As shown in the upper portion of FIG. 9, at a first time unit (e.g., after scheduling frames at time 0), AP1 may identify a frame with a smallest FSN in the frame schedule (e.g., 30), and may provide the frame to a corresponding client device 210 (e.g., CD4). As shown, AP1 may then update a GSN (e.g., from 0 to 30) based on providing the frame to CD4. As further shown, AP1 may, at a second time unit (e.g., after scheduling additional frames at time 1), identify a frame with a next smallest FSN in the frame schedule (e.g., 40), and may provide the frame to a corresponding client device 210 (e.g., CD3). As shown, AP1 may again update the GSN (e.g., from 30 to 40) based on providing the frame to CD3.

As further shown, AP1 may, at a third time unit, identify a frame with a next smallest FSN in the frame schedule (e.g., 60). As shown, two frames identified in the frame schedule have an FSN equal to 60. Assuming that the frame for CD2 was scheduled first, AP1 may provide the frame for CD2 (e.g., at the third time unit), and may update the GSN (e.g., from 40 to 60) based on providing the frame to CD2. AP1 may then, at a fourth time unit, provide the frame for CD4 to CD4, and may not update the GSN (e.g., since the FSN for the last two frames was equal to 60). AP1 may continue providing the first twenty frames in this manner. A graphical representation of the first twenty frames provided by AP1 is shown in the middle portion of FIG. 9.

As shown in the lower portion of FIG. 9, providing frames in the manner described above results in airtime fairness between the rates, associated with each client device, since the number of frames provided for each rate (e.g., in an example 800 microsecond time period) directly corresponds to a relative percentage of each rate with respect to a total rate (e.g., CD1 Rate=12 Mbps=10% of total of all rates (120 Mbps) 10% airtime dedicated to CD1 rate in 800 microsecond time period, CD2 Rate=24 Mbps=20% of total of all rates (120 Mbps) 20% airtime dedicated to CD2 rate in 800 microsecond time period, CD3 Rate=36 Mbps=30% of total of all rates (120 Mbps) 30% airtime dedicated to CD3 rate in 800 microsecond time period, CD4 Rate=48 Mbps=40% of total of all rates (120 Mbps) 40% airtime dedicated to CD4 rate in 800 microsecond time period).

As indicated above, FIG. 9 is provided merely as an example. Other examples are possible and may differ from what was described with regard to FIG. 9.

FIGS. 10A-10D are diagrams of an example implementation 1000 relating to example processes 400, 600, and 800 shown in FIG. 4, FIG. 6, and FIG. 8, respectively. For the purposes of example implementation 1000, assume that AP device 220 (e.g., AP1), associated with WLAN 230, is configured to implement a hierarchical QoS policy that identifies two traffic classes (e.g., traffic class A with a rate of 12 Mbps, and traffic class B with a rate of 48 Mbps), and that each traffic class has two sub-classes (e.g., traffic class A1=4.8 Mbps, traffic class A2=7.2 Mbps, traffic class B1=14.4 Mbps, and traffic class B2=33.6 Mbps. Further, assume that a first client device 210 (e.g., CD1) is to receive data, associated with a first service (e.g., service 1), at the traffic class A1 rate, and data, associated with a second service (e.g., service 2), at the traffic class A2 rate. Finally, assume that a second client device 210 (e.g., CD2) is to receive data, associated with a third service (e.g., service 3), at the traffic class B1 rate, and data, associated with a fourth service (e.g., service 4), at the traffic class B2 rate.

Figure 10A:
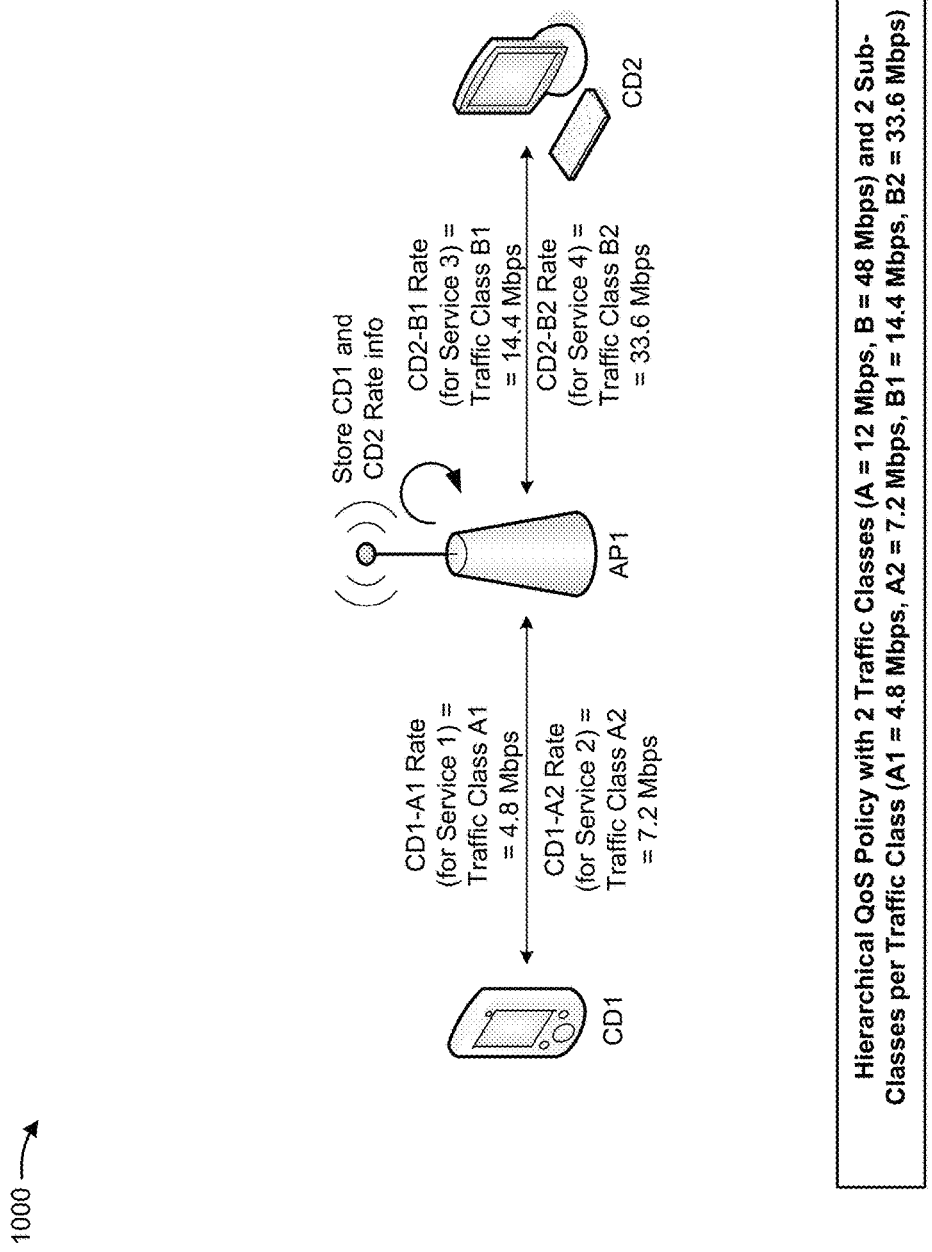
FIGS. 10A-10D are diagrams of an example implementation relating to the example processes shown in FIG. 4, FIG. 6, and FIG. 8.

As shown in FIG. 10A, CD1 may provide (e.g., when connecting to AP1) rate information indicating that CD1 is to receive data, associated with service 1, at a rate of 4.8 Mbps (herein referred to as the A1 rate), and that CD1 is to receive data, associated with service 2, at a rate of 7.2 Mbps (herein referred to as the A2 rate). As further shown, CD2 may provide (e.g., when connecting to AP1) rate information indicating that CD2 is to receive data, associated with service 3, at a rate of 14.4 Mbps (herein referred to as the B1 rate), and that CD2 is to receive data, associated with service 4, at a rate of 33.6 Mbps (herein referred to as the B2 rate). As shown, AP1 may store the rate information, associated with CD1 and CD2, in order to allow AP1 to schedule frames, to be provided to CD1 and CD2, such that airtime fairness for each traffic rate is achieved, as described below.

Figure 10B:
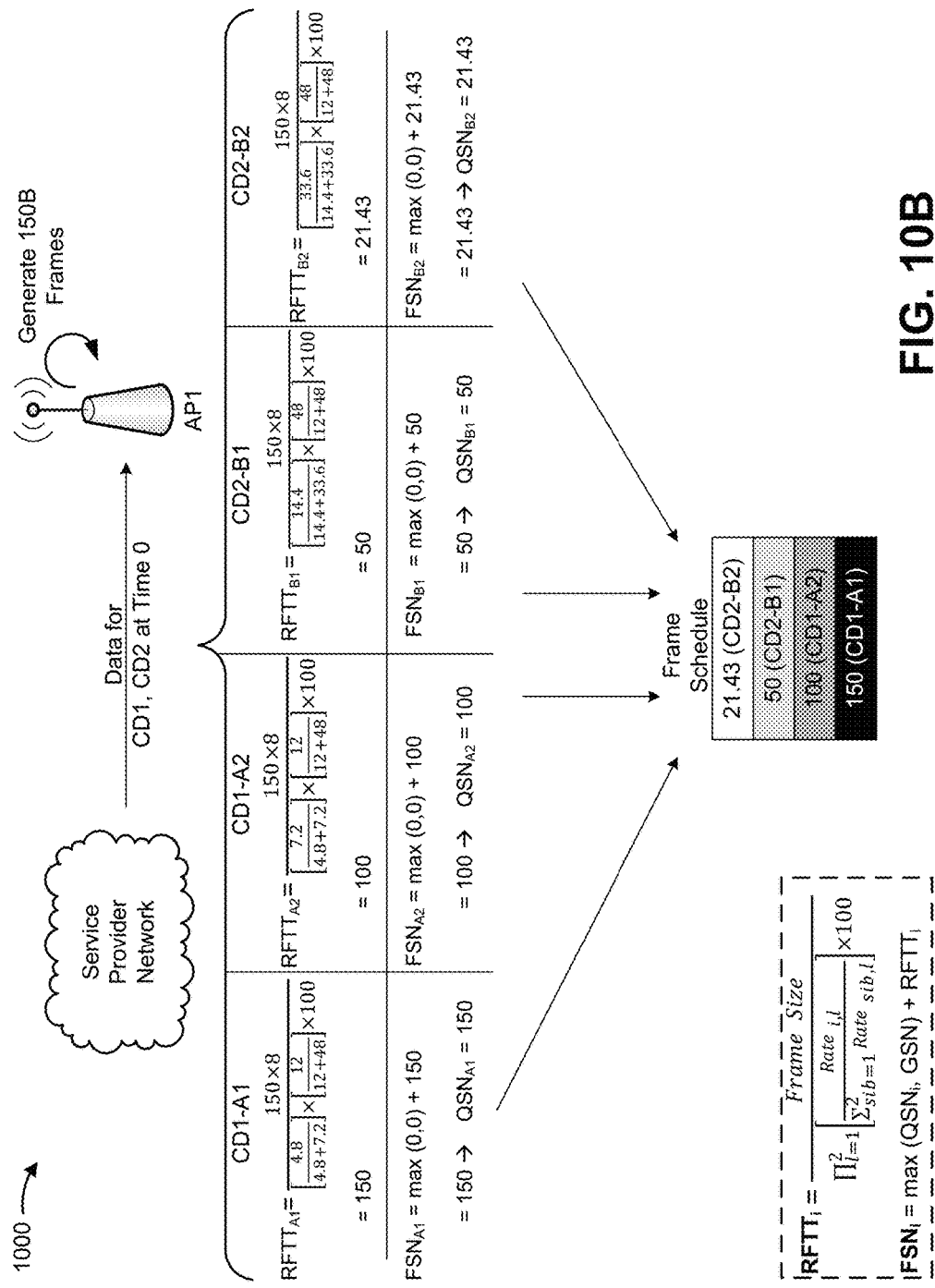

As shown in FIG. 10B, at a first time unit (e.g., time 0), AP1 may receive data destined for CD1 and CD2 (e.g., associated with service 1 through service 4), and may generate a first set of frames of frame size 150B (e.g., a first frame associated with service 1 data, a first frame associated with service 2 data, a third frame associated with service 3 data, and a fourth frame associated with service 4 data). As further shown, AP1 may determine (e.g., based on the 150B frame size and the rate information associated with each client device 210) an RFTT corresponding to the A1 rate (e.g., $RFTT_{A1}=150\times8/[(4.8/4.8+7.2)\times(12/12+48)\times100]=150$), an RFTT corresponding to the A2 rate (e.g., $RFTT_{A2}=150\times8/[(7.2/4.8+7.2)\times(12/12+48)\times100]=100$), an RFTT corresponding to the B1 rate (e.g., $RFTT_{B1}=150\times8/[(14.4/14.4+33.6)\times(48/12+48)\times100]=50$), and an RFTT corresponding to the B2 rate (e.g., $RFTT_{B2}=150\times8/[(33.6/14.4+33.6)\times(48/12+48)\times100]=21.43$).

As further shown, AP1 may determine an FSN for each frame, of the first set of frames, to be provided to each client device 210 (e.g., based on a corresponding RFTT, a corresponding QSN, and a GSN). For the purposes of FIG. 10B, assume that a QSN, corresponding to a queue (e.g., managed by AP device 220) associated with each rate, is equal to zero (e.g., since AP1 has not scheduled any frames) and that a GSN, associated with AP1, is equal to zero (e.g., since AP1 has not provided any frames). As shown, AP1 may determine an FSN for the first frame to be provided to CD1 at the A1 rate (e.g., $FSN_{A1}=\max(0,0)+150=150$), an FSN for the first frame to be provided to provided to CD1 at the A2 rate (e.g., $FSN_{A2}=\max(0,0)+100=100$), an FSN for the first frame to be provided to CD2 at the B1 rate (e.g., $FSN_{B1}=\max(0,0)+50=50$), and an FSN for the first frame to be provided to CD2 at the B2 rate (e.g., $FSN_{B2}=\max(0,0)+21.43=21.43$).

As further shown, AP1 may then schedule the first set of frames (e.g., each first frame to be provided to a respective client device 210) based on the FSN for each frame. As shown, AP1 may schedule the frames for provision in order based on the FSNs as follows: the first frame at the B2 rate (e.g., $FSN_{B2}=21.43$), the first frame at the B1 rate (e.g., $FSN_{B1}=50$), the first frame at the A2 rate (e.g., $FSN_{A2}=100$), and the first frame at the A1 rate (e.g., $FSN_{A1}=150$). As further shown, AP1 may then update each QSN (e.g., corresponding to each rate), such that each respective QSN is equal to a corresponding FSN scheduled by AP1 (e.g., $QSN_{A1}=150$, $QSN_{A2}=100$ $QSN_{B1}=50$, and $QSN_{B2}=21.43$).

Figure 10C:
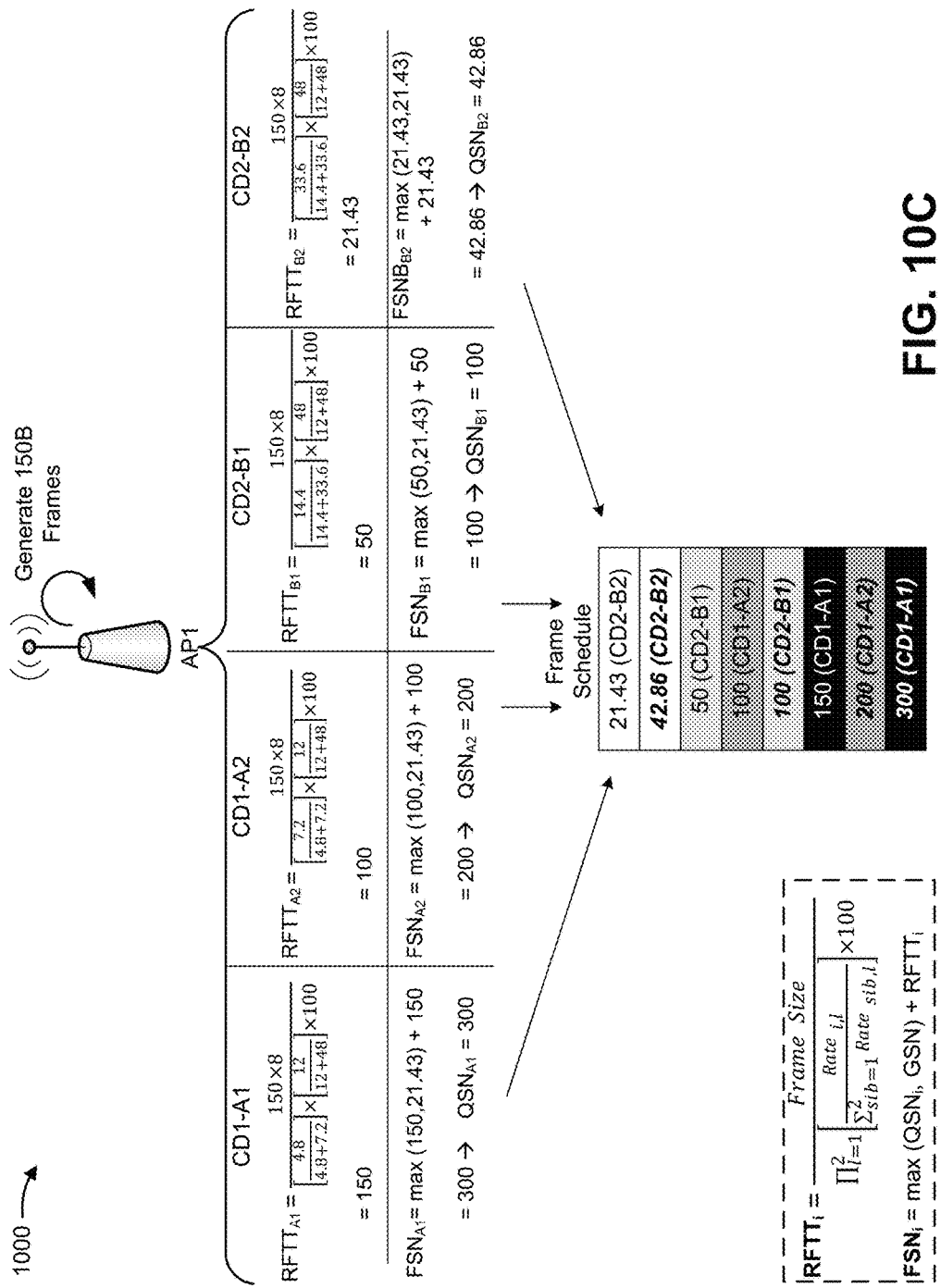

As shown in FIG. 10C, at a next time unit (e.g., at time 1, immediately following time 0), AP1 may generate a second set of frames of frame size 150B, and may schedule the second set of frames for provision to CD1 and CD2. For the purposes of FIG. 10C, assume that AP1 stored the RFTTs determined above, and that the frame size and the rate information has not changed (e.g., such that AP1 may use the same RFTTs for the frame scheduling at the next time unit).

As shown, AP1 may determine an FSN for each frame of the second set of frames. For the purposes of FIG. 10B, assume that the GSN associated with AP1 is equal to 21.43 (e.g., AP1 has provided the first scheduled frame to CD2 at time 1 and updated the GSN accordingly). As shown, AP1 may determine an FSN for the second frame to be provided to CD1 at the A1 rate (e.g., $FSN_{A1}=\max(150,21.43)+150=300$), an FSN for the second frame to be provided to CD1 at the A2 rate (e.g., $FSN_{A2}=\max(100,21.43)+100=200$), an FSN for the second frame to be provided to CD2 at the B1 rate (e.g., $FSN_{B1}=\max(50,21.43)+50=100$), and an FSN for the second frame to be provided to CD2 at the B2 rate (e.g., $FSN_{B2}=\max(21.43+21.43)+21.43=42.86$).

As further shown, AP1 may then schedule the second set of frames (e.g., each second frame to be provided to a respective client device 210) based on the FSN for each frame. As shown, AP1 may add the frames to the frame schedule, based on the FSNs, such that the frame schedule is as follows: the first frame at the B2 rate (e.g., $FSN_{B2}=21.43$, already provided to CD2), the second frame at the B2 rate (e.g., $FSN_{B2}=42.86$), the first frame at the B1 rate (e.g., $FSN_{B1}=50$), the first frame at the A2 rate (e.g., $FSN_{A2}=100$), the second frame at the B1 rate (e.g., $FSN_{B1}=100$), the first frame at the A1 rate (e.g., $FSN_{A1}=150$), the second frame at the A2 rate (e.g., $FSN_{A2}=200$), and the second frame at the A1 rate (e.g., $FSN_{A1}=300$). As further shown, AP1 may then update each QSN (e.g., corresponding to each rate), such that each respective QSN is equal to a corresponding FSN scheduled by AP1 (e.g., $QSN_{A1}=300$, $QSN_{A2}=200$, $QSN_{B1}=100$, and $QSN_{B2}=42.86$). AP1 may continue scheduling additional frames in this manner.

Figure 10D:
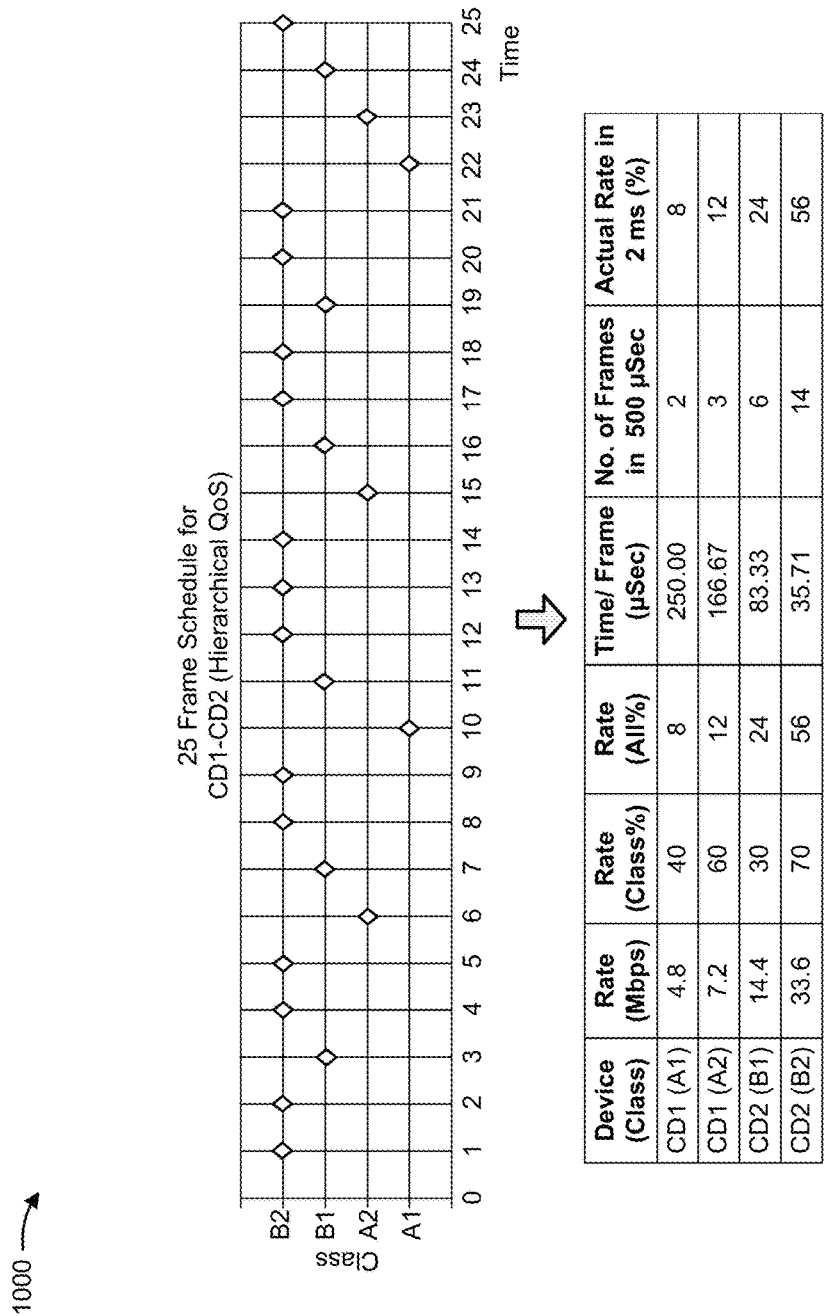

As shown in FIG. 10D, assume that AP1 continues scheduling and providing frames, in the manner described above, such that AP1 provides 25 frames, as shown in the upper portion of FIG. 10D. As shown in the lower portion of FIG. 10D, scheduling and providing frames in this manner results in airtime fairness between the rates, associated with each client device, since the number of frames provided for each rate (e.g., in an example 2 millisecond (ms) time period) directly corresponds to a relative percentage of each rate with respect to a total rate (e.g., CD1 rate A1=4.8 Mbps=8% of total of all rates (60 Mbps) 8% airtime dedicated to CD1 rate A1 in 2 ms time period, CD1 rate A2=7.2 Mbps=12% of total of all rates (60 Mbps) 12% airtime dedicated to CD1 rate A2 in 2 ms time period, CD2 rate B1=14.4 Mbps=24% of total of all rates (60 Mbps) 24% airtime dedicated to CD2 rate B2 in 2 ms time period, CD2 rate B2=33.6 Mbps=56% of total of all rates (60 Mbps) 56% airtime dedicated to CD2 rate B2 in 2 ms time period). In this way, relative airtime fairness among the four rates may be achieved.

As indicated above, FIGS. 10A-10D are provided merely as an example. Other examples are possible and may differ from what was described with regard to FIGS. 10A-10D.

Implementations described herein may allow an AP device to assign frame scheduling numbers (FSNs) to frames that include data that is to be provided at two or more rates, schedule the frames based on the FSNs, and provide the frames based on the frame schedule such that airtime fairness, associated with the providing the data at the two or more rates, is achieved.

As described above, scheduling and providing frames in this manner may ensure fairness, hence preventing a slow-speed client device from slowing other client devices included in a WLAN. Moreover, implementations described herein may allow for reduced complexity of a scheduler component since the AP device may look ahead for a frame scheduling sequence (e.g., the AP device may identify scheduled frames directly from the frame schedule). Similarly, scheduling of frames based on a hierarchical QoS policy AP may be simplified since queuing is done only at the lowest level of the QoS policy. Additionally, as shown, frames associated with each QoS traffic class may be scheduled relative to frames associated other QoS traffic classes, thus proportionally distributing available airtime among all of the QoS traffic classes.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
generate a frame that includes data to be provided to a client device,
the data being associated with a data rate corresponding to the client device;
determine rate information associated with a set of client devices,
the rate information identifying the data rate and one or more other data rates,
the data rate being different than the one or more other data rates,
the one or more other data rates including another data rate at which other data is to be provided to a different client device, and
the set of client devices including the client device and the different client device;
determine, based on the data rate, the other data rate, and a frame size of the frame, a relative frame transmission time (RFTT) associated with the frame;
determine a frame scheduling number (FSN), associated with the frame, based on the RFTT;
schedule the frame for provision to the client device based on the FSN; and
provide the frame to the client device based on scheduling the FSN,
the frame being provided to cause relative airtime fairness between a first group of frames, corresponding to the data rate, and a second group of frames, corresponding to the one or more other data rates, to be achieved,
the first group of frames including the frame.

2. The device of claim 1,
where the one or more processors are further to:
determine a queue scheduling number (QSN) associated with a queue that corresponds to the data rate; and
determine a global scheduling number (GSN) associated with the device; and
where the one or more processors, when determining the FSN, are to:
determine the FSN based on the RFTT, the QSN, and the GSN.

3. The device of claim 2, where the one or more processors, when determining the FSN, are to:
determine a maximum value of the QSN and the GSN,
the maximum value matching the QSN or matching the GSN;
sum the maximum value and a value of the RFTT to obtain a result; and
determine the FSN based on the result.

4. The device of claim 2, where the one or more processors, when scheduling the frame for provision to the client device based on the FSN, are further to:
update the QSN such that the QSN is equal to the FSN.

5. The device of claim 2, where the one or more processors, when providing the frame to the client device based on scheduling the FSN, are further to:
update the GSN such that the GSN is equal to the FSN.

6. The device of claim 1, where the one or more processors, when scheduling the frame for provision to the client device, are to:
add the frame to a frame schedule, based on the FSN, to cause the frame to be provided after another frame,
the other frame being scheduled at an earlier time and being associated with another FSN,
the other FSN being equal to the FSN.

7. The device of claim 1, where the device is an access point included in a wireless network.

8. A computer-readable medium storing instructions, the instructions comprising:
one or more instructions that, when executed by one or more processors, cause the one or more processors to:
receive a frame that includes data to be provided to a client device,
the data being associated with a data rate corresponding to the client device;
determine rate information associated with a group of client devices,
the rate information including the data rate and one or more other data rates,
the data rate being different than the one or more other data rates,
the one or more other data rates including another data rate at which other data is to be provided to a different client device, and
the group of client devices including the client device and the different client device;
determine a relative frame transmission time (RFTT) associated with the frame,
the RFTT being determined based on the data rate, the other data rate, and a frame size of the frame;
determine a frame scheduling number (FSN) associated with the frame,
the FSN being determined based on the RFTT;
schedule the frame for provision to the client device,
the frame being scheduled based on the FSN; and
provide the frame to the client device after scheduling the frame,
the frame being provided such that relative airtime fairness between a first set of frames, associated with the data rate, and a second set of frames, associated with the one or more other data rates, is achieved,
the first set of frames including the frame.

9. The computer-readable medium of claim 8,
where the one or more instructions, when executed by the one or more processors, further cause the one or more processors to:
determine a queue scheduling number (QSN) associated with a queue that corresponds to the data rate; and
determine a global scheduling number (GSN); and
where the one or more instructions, that cause the one or more processors to determine the FSN, cause the one or more processors to:
determine the FSN based on the RFTT and at least one of the QSN or the GSN.

10. The computer-readable medium of claim 9, where the one or more instructions, that cause the one or more processors to determine the FSN, further cause the one or more processors to:

determine a maximum number of the QSN and the GSN, the maximum number being the QSN or the GSN;
sum the maximum number and a value of the RFTT to obtain a result; and
determine the FSN as being equal to the result.

11. The computer-readable medium of claim 9, where the one or more instructions, that cause the one or more processors to schedule the frame for provision to the client device, further cause the one or more processors to:
update the QSN such that the QSN is equal to the FSN.

12. The computer-readable medium of claim 9, where the one or more instructions, that cause the one or more processors to provide the frame to the client device, further cause the one or more processors to:
update the GSN such that the GSN is equal to the FSN.

13. The computer-readable medium of claim 8, where the one or more instructions, that cause the one or more processors to schedule the frame for provision to the client device, cause the one or more processors to:
add the frame to a frame schedule, based on the FSN, to cause the frame to be provided after another frame,
the other frame being associated with another FSN,
the other FSN being less than the FSN.

14. The computer-readable medium of claim 8, where the client device is included in a wireless local area network that implements Institute of Electrical and Electronics Engineers 802.11 standards.

15. A method, comprising:
obtaining, by a device, a frame to be provided to a client device,
the frame including data associated with a data rate corresponding to the client device;
determining, by the device, rate information associated with a set of client devices,
the rate information identifying the data rate and one or more other data rates,
the one or more other data rates including another data rate at which other data is to be provided to a different client device, and
the set of client devices including the client device and the different client device;
computing, by the device and based on the data rate, the other data rate, and a frame size of the frame, a relative frame transmission time (RFTT) associated with the frame;
determining, by the device, a queue scheduling number (QSN) associated with a queue that corresponds to the data rate;
determining, by the device, a global scheduling number (GSN) associated with the device;
computing, by the device, a frame scheduling number (FSN) associated with the frame,
the FSN being computed based on the RFTT, the QSN, and the GSN;
scheduling, by the device and based on the FSN, the frame for provision to the client device; and
providing, by the device, the frame to the client device,
the frame being scheduled and provided such that relative airtime fairness between a first group of frames, corresponding to the data rate, and a second group of frames, corresponding to the one or more other data rates, is achieved,
the first group of frames including the frame.

16. The method of claim 15, further comprising:
determining a maximum number of the QSN and the GSN,
the maximum number being the QSN or the GSN, and
where computing the FSN comprises:
computing the FSN by summing the maximum number and a value of the RFTT.

17. The method of claim 15, where scheduling the frame for provision to the client device further comprises:
updating the QSN such that the QSN is equal to the FSN.

18. The method of claim 15, where providing the frame to the client device further comprises:
updating the GSN such that the GSN is equal to the FSN.

19. The method of claim 15, where scheduling the frame for provision to the client device further comprises:
adding the frame to a frame schedule, based on the FSN, to cause the frame to be provided before another frame,
the other frame being scheduled at an earlier time and being associated with another FSN,
the other FSN being greater than the FSN.

20. The method of claim 15, where the device is an access point device included in a wireless local area network.

* * * * *